US012634307B2

(12) United States Patent
dos Santos Lopes

(10) Patent No.: US 12,634,307 B2
(45) Date of Patent: May 19, 2026

(54) MACHINE OPERATION RECOGNITION ENGINE WITH AUTOMATED MACHINE LEARNING MODEL UPDATE

(71) Applicant: Rapid7, Inc., Boston, MA (US)

(72) Inventor: Luis Ramos dos Santos Lopes, Galway (IE)

(73) Assignee: Rapid7, Inc., Boston, MA (US)

( * ) Notice: Subject to any disclaimer, the term of this patent is extended or adjusted under 35 U.S.C. 154(b) by 175 days.

(21) Appl. No.: 18/773,689

(22) Filed: Jul. 16, 2024

(65) Prior Publication Data

US 2024/0380762 A1    Nov. 14, 2024

Related U.S. Application Data

(63) Continuation of application No. 17/237,004, filed on Apr. 21, 2021, now Pat. No. 12,063,224.

(51) Int. Cl.
H04L 29/06 (2006.01)
H04L 9/40 (2022.01)

(52) U.S. Cl.
CPC ...... H04L 63/1416 (2013.01); H04L 63/1425 (2013.01); H04L 63/145 (2013.01); H04L 63/20 (2013.01)

(58) Field of Classification Search
CPC ............. H04L 63/1416; H04L 63/1425; H04L 63/145; H04L 63/20
See application file for complete search history.

(56) References Cited

U.S. PATENT DOCUMENTS

| | | | |
|---|---|---|---|
| 10,609,167 B1 | 3/2020 | Angeles | |
| 10,721,239 B2 | 7/2020 | Koottayi et al. | |
| 10,936,717 B1 * | 3/2021 | Herman Saffar | ... G06F 9/45558 |
| 2019/0124099 A1 * | 4/2019 | Matselyukh | ........... H04L 41/16 |
| 2019/0190960 A1 | 6/2019 | Amro et al. | |

* cited by examiner

Primary Examiner — Jeffrey C Pwu
Assistant Examiner — Thong P Truong
(74) Attorney, Agent, or Firm — Ashwin Anand

(57) ABSTRACT

Systems and methods are disclosed to implement a network data interpretation pipeline to recognize machine operations (MOs) and machine activities (MAs) from network traffic data observed in a monitored network. In embodiments, a MO recognition engine is implemented in the network to recognize MOs from network sensor events (NSEs) based on defined recognition patterns. The MOs and any unrecognized NSEs are uploaded to a network monitoring system, where they are further analyzed by a MA recognition engine to recognize higher-level machine activities performed by machines. The NSEs, MOs, and MAs are used by the network monitoring system to implement a variety of security threat detection processes. Advantageously, the pipeline may be used to add rich contextual information about the raw network data to facilitate security threat detection processes. Additionally, the MOs and MAs can be used to present the raw network data in a variety of intuitive user interfaces.

20 Claims, 12 Drawing Sheets

Figure 2A:
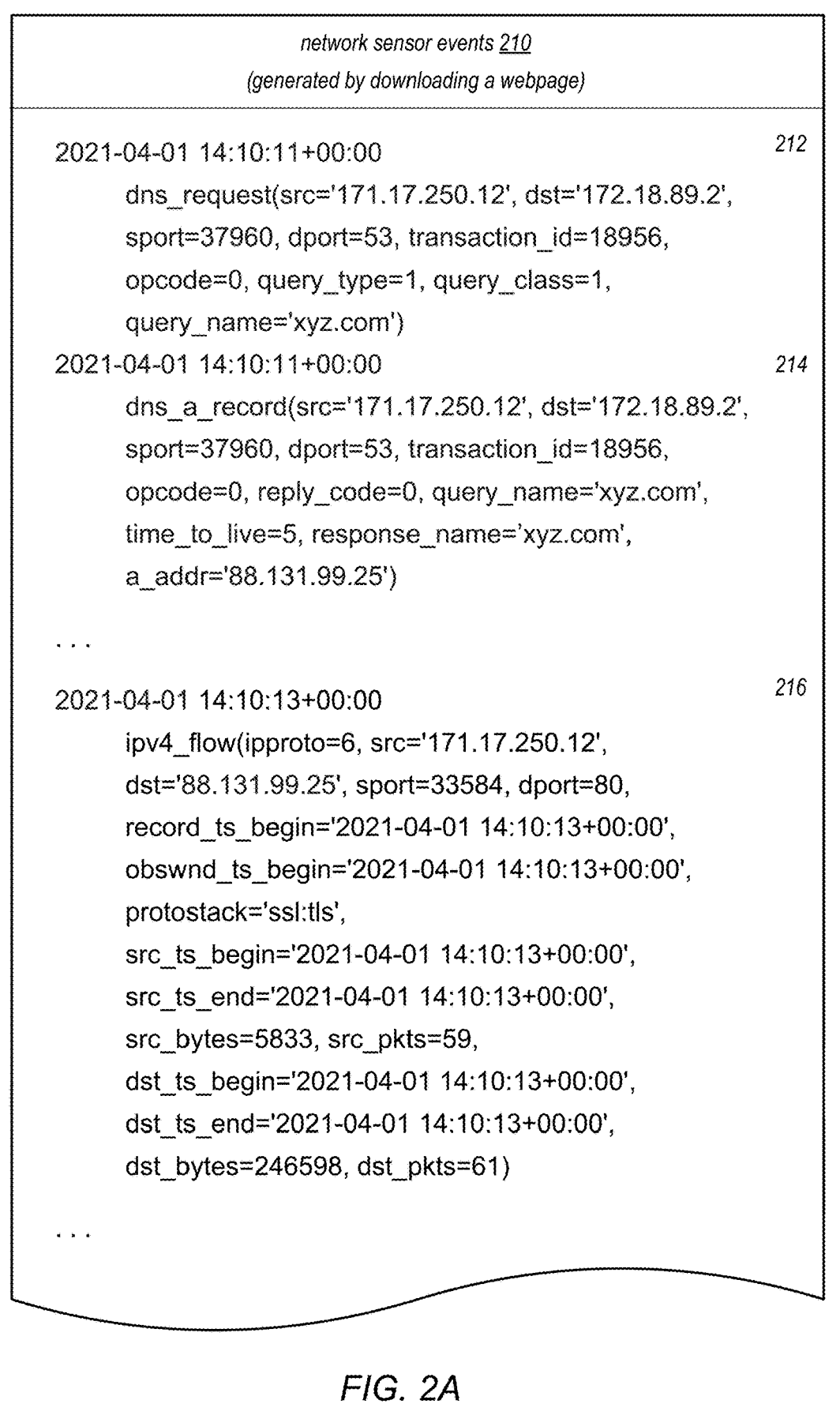

*network sensor events 210*
*(generated by downloading a webpage)*

2021-04-01 14:10:11+00:00                                                      *212* dns_request(src='171.17.250.12', dst='172.18.89.2', sport=37960, dport=53, transaction_id=18956, opcode=0, query_type=1, query_class=1, query_name='xyz.com')

2021-04-01 14:10:11+00:00                                                      *214* dns_a_record(src='171.17.250.12', dst='172.18.89.2', sport=37960, dport=53, transaction_id=18956, opcode=0, reply_code=0, query_name='xyz.com', time_to_live=5, response_name='xyz.com', a_addr='88.131.99.25')

. . .

2021-04-01 14:10:13+00:00                                                      *216* ipv4_flow(ipproto=6, src='171.17.250.12', dst='88.131.99.25', sport=33584, dport=80, record_ts_begin='2021-04-01 14:10:13+00:00', obswnd_ts_begin='2021-04-01 14:10:13+00:00', protostack='ssl:tls', src_ts_begin='2021-04-01 14:10:13+00:00', src_ts_end='2021-04-01 14:10:13+00:00', src_bytes=5833, src_pkts=59, dst_ts_begin='2021-04-01 14:10:13+00:00', dst_ts_end='2021-04-01 14:10:13+00:00', dst_bytes=246598, dst_pkts=61)

Figure 2B:
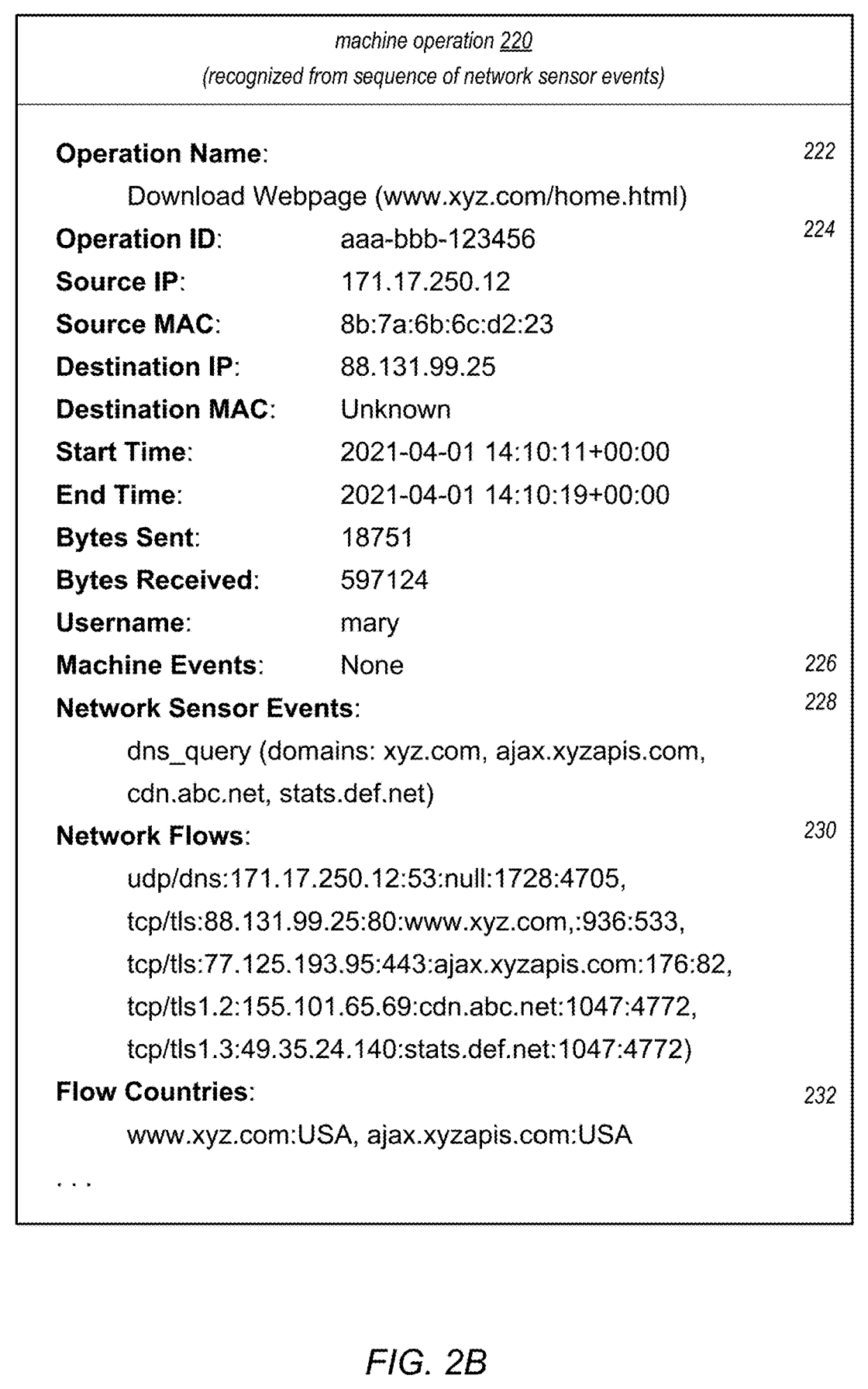

*machine operation 220*
*(recognized from sequence of network sensor events)*

Operation Name:                                                              222

Download Webpage (www.xyz.com/home.html)

Operation ID:        aaa-bbb-123456                                          224

Source IP:           171.17.250.12

Source MAC:          8b:7a:6b:6c:d2:23

Destination IP:      88.131.99.25

Destination MAC:     Unknown

Start Time:          2021-04-01 14:10:11+00:00

End Time:            2021-04-01 14:10:19+00:00

Bytes Sent:          18751

Bytes Received:      597124

Username:            mary

Machine Events:      None                                                    226

Network Sensor Events:                                                       228 dns_query (domains: xyz.com, ajax.xyzapis.com, cdn.abc.net, stats.def.net)

Network Flows:                                                               230 udp/dns:171.17.250.12:53:null:1728:4705, tcp/tls:88.131.99.25:80:www.xyz.com,:936:533, tcp/tls:77.125.193.95:443:ajax.xyzapis.com:176:82, tcp/tls1.2:155.101.65.69:cdn.abc.net:1047:4772, tcp/tls1.3:49.35.24.140:stats.def.net:1047:4772)

Flow Countries:                                                              232 www.xyz.com:USA, ajax.xyzapis.com:USA

*machine activity 240*
*(recognized from sequence of machine operations and network sensor events)*

| | | |
|---|---|---|
| Activity Name: | Browse Website (www.xyz.com) | 242 |
| Activity ID: | aaa-bbb-567890 | 244 |
| Source IP: | 171.17.250.12 | |
| Source MAC: | 8b:7a:6b:6c:d2:23 | |
| Destination IP: | 88.131.99.25 | |
| Destination MAC: | Unknown | |
| Start Time: | 2021-04-01 14:10:11+00:00 | |
| End Time: | 2021-04-01 14:15:19+00:00 | |
| Bytes Sent: | 45753 | |
| Bytes Received: | 254797 | |
| Username: | mary | |
| Machine Events: | commands (/opt/bbb/browser-app) | 246 |
| Network Sensor Events: None | | 248 |
| Machine Operations: | | 249 |

Download Webpage (www.xyz.com/home.html),

Download Webpage (www.xyz.com/about.html),

Download Webpage (www.xyz.com/contact.php),

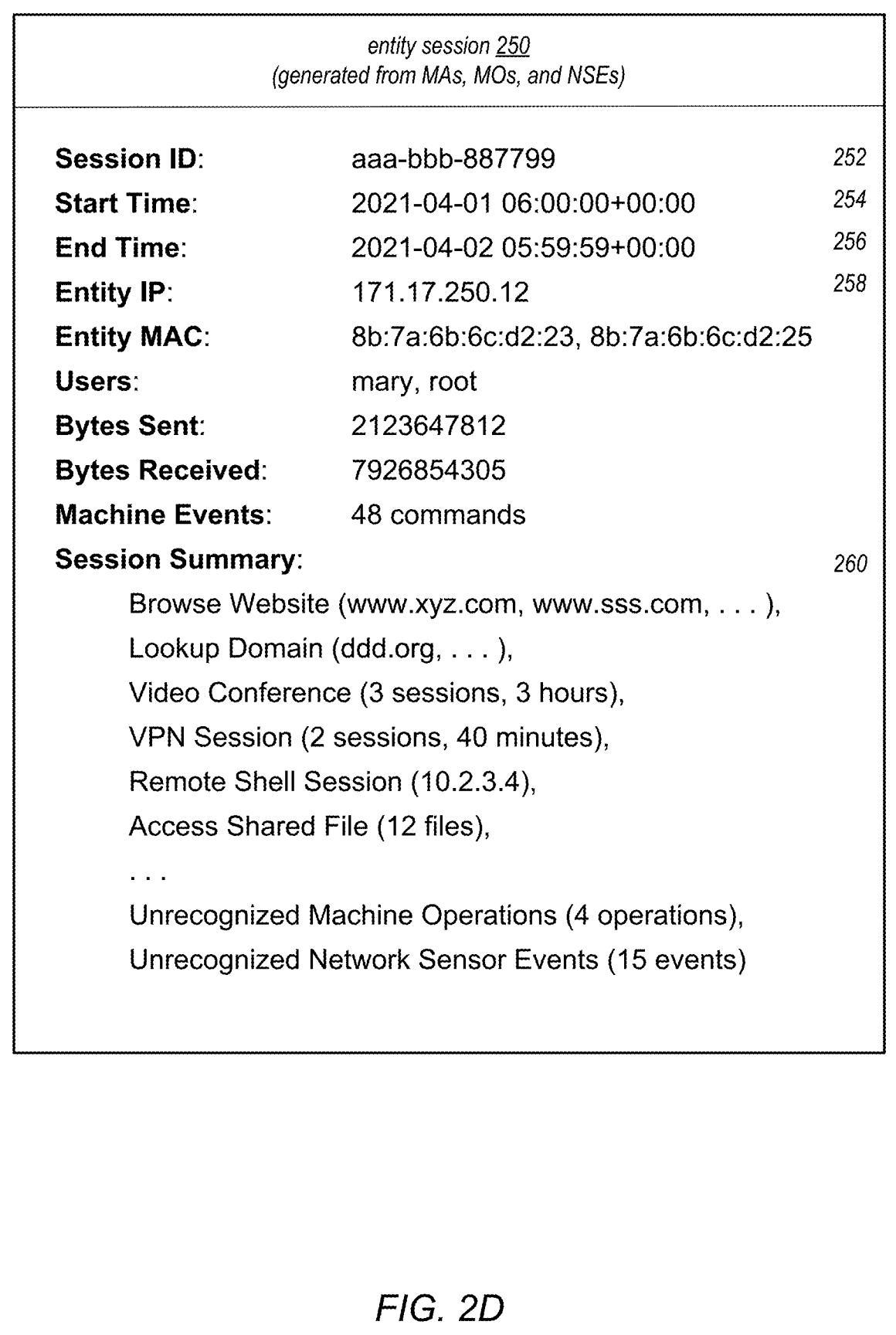

*entity session 250*
*(generated from MAs, MOs, and NSEs)*

Session ID: aaa-bbb-887799 *252*

Start Time: 2021-04-01 06:00:00+00:00 *254*

End Time: 2021-04-02 05:59:59+00:00 *256*

Entity IP: 171.17.250.12 *258*

Entity MAC: 8b:7a:6b:6c:d2:23, 8b:7a:6b:6c:d2:25

Users: mary, root

Bytes Sent: 2123647812

Bytes Received: 7926854305

Machine Events: 48 commands

Session Summary: *260*

Browse Website (www.xyz.com, www.sss.com, . . . ),

Lookup Domain (ddd.org, . . . ),

Video Conference (3 sessions, 3 hours),

VPN Session (2 sessions, 40 minutes),

Remote Shell Session (10.2.3.4),

Access Shared File (12 files),

. . .

Unrecognized Machine Operations (4 operations),

Unrecognized Network Sensor Events (15 events)

*FIG. 2D*

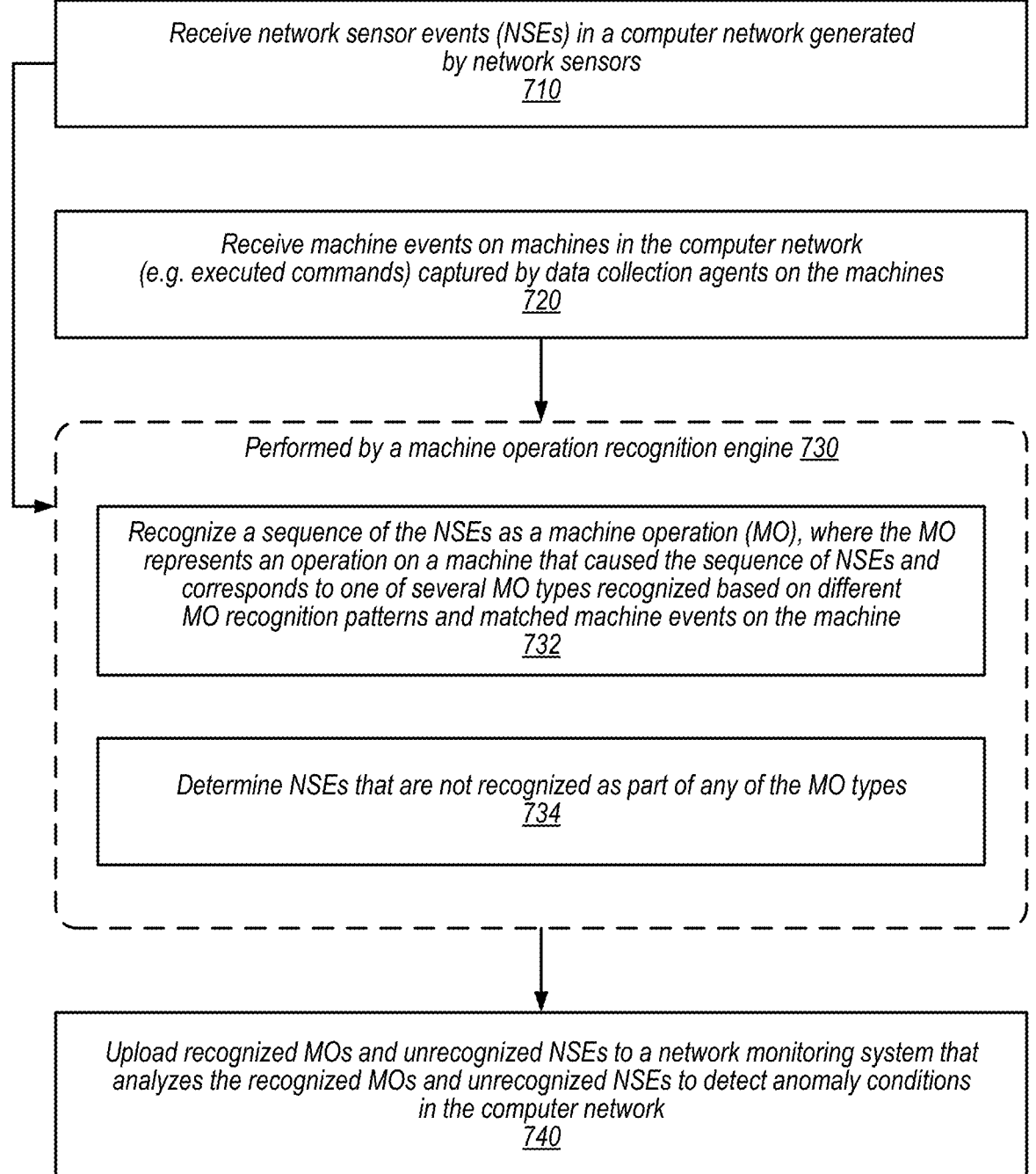

Receive network sensor events (NSEs) in a computer network generated
by network sensors
710

Receive machine events on machines in the computer network
(e.g. executed commands) captured by data collection agents on the machines
720

Performed by a machine operation recognition engine 730

Recognize a sequence of the NSEs as a machine operation (MO), where the MO
represents an operation on a machine that caused the sequence of NSEs and
corresponds to one of several MO types recognized based on different
MO recognition patterns and matched machine events on the machine
732

Determine NSEs that are not recognized as part of any of the MO types
734

Upload recognized MOs and unrecognized NSEs to a network monitoring system that
analyzes the recognized MOs and unrecognized NSEs to detect anomaly conditions
in the computer network
740

FIG. 7

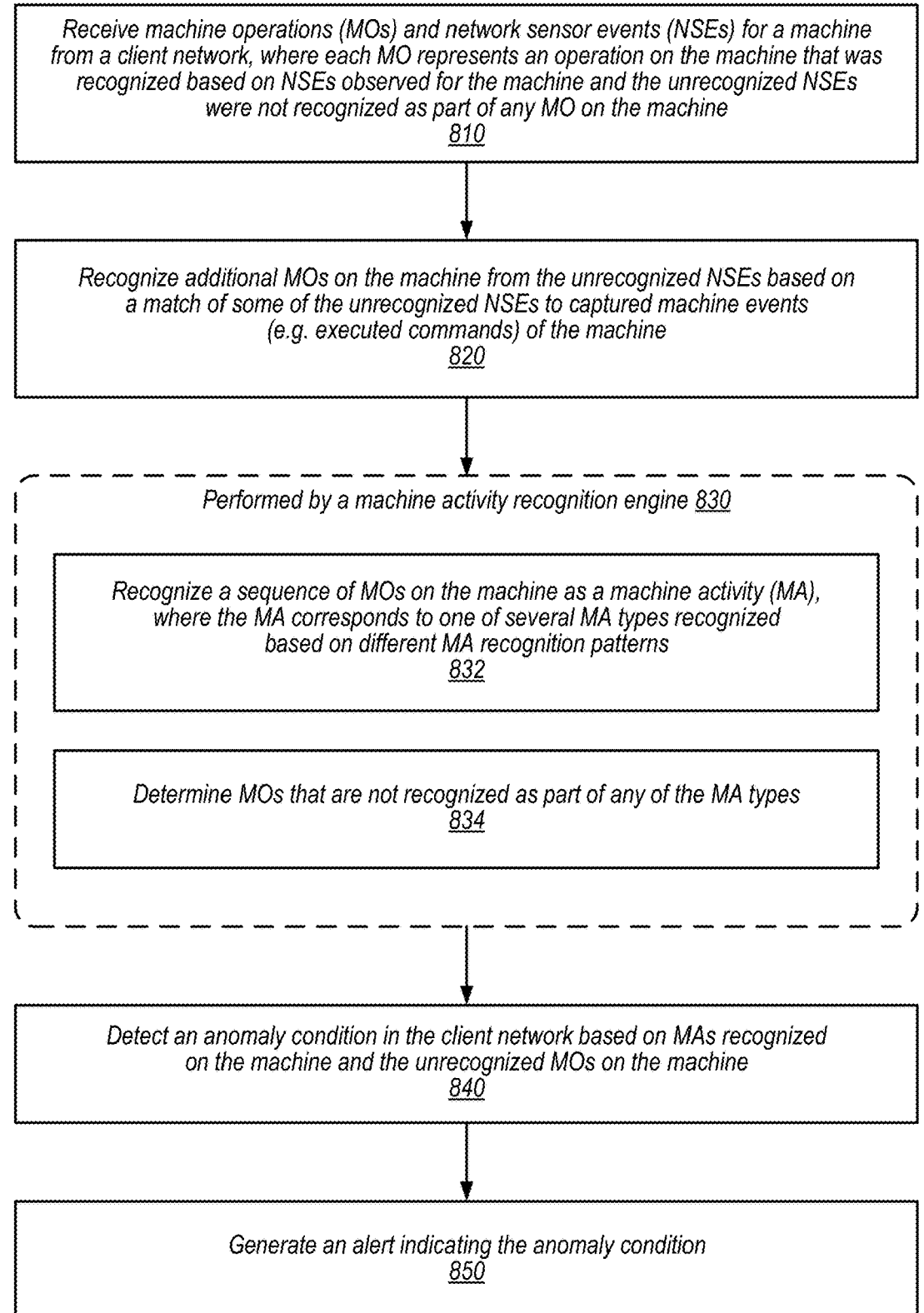

Receive machine operations (MOs) and network sensor events (NSEs) for a machine from a client network, where each MO represents an operation on the machine that was recognized based on NSEs observed for the machine and the unrecognized NSEs were not recognized as part of any MO on the machine
810

Recognize additional MOs on the machine from the unrecognized NSEs based on a match of some of the unrecognized NSEs to captured machine events (e.g. executed commands) of the machine
820

Performed by a machine activity recognition engine 830

Recognize a sequence of MOs on the machine as a machine activity (MA), where the MA corresponds to one of several MA types recognized based on different MA recognition patterns
832

Determine MOs that are not recognized as part of any of the MA types
834

Detect an anomaly condition in the client network based on MAs recognized on the machine and the unrecognized MOs on the machine
840

Generate an alert indicating the anomaly condition
850

FIG. 8

MACHINE OPERATION RECOGNITION ENGINE WITH AUTOMATED MACHINE LEARNING MODEL UPDATE

This Application claims priority under 35 U.S.C. § 120 and is a continuation of U.S. patent application Ser. No. 17/237,004, filed Apr. 21, 2021, titled "NETWORK DATA INTERPRETATION PIPELINE FOR RECOGNIZING MACHINE OPERATIONS AND ACTIVITIES FROM NETWORK SENSOR DATA" the entire contents of which are incorporated herein by reference in its entirety.

BACKGROUND

Modern network security systems offer the ability to monitor network traffic in client networks for security events, such as signs of unauthorized intrusion or other types of malicious activity. In some such systems, network sensors are deployed inside the client network to collect network traffic metadata and upload the metadata to a centralized network monitoring platform. A network sensor connected to a large network can generate a huge volume of networks sensor events. The sheer number of these events and the amount of technical information contained in the events make them extremely difficult to use for network security analysis. On the other hand, the sensor events typically do not provide certain types of vital information such as the activities of users or machines that generated the observed network traffic. Considerable technical knowledge and labor is required to sift through the data to eliminate extraneous noise and piece together related sensor events to reconstruct a view of activities within the network. Moreover, most network monitoring systems are only programmed to watch for known patterns of suspicious behavior in the network data. As a result, they can miss a novel type of attack that produces a network traffic pattern not anticipated by the system. Further, the routine uploading of large amounts of network metadata is wasteful in terms of resource usage and raises additional security concerns. There is a general need in the field for better ways of collecting network metadata from client networks to improve the functioning network monitoring systems.

SUMMARY OF EMBODIMENTS

The systems and methods described herein may be employed in various combinations and embodiments to implement a network data interpretation pipeline for recognizing machine operations (MOs) and machine activities (MAs) from network traffic data observed in a monitored client network. In some embodiments, a MO recognition engine is implemented in the client network to recognize different types of MOs from network sensor events (NSEs) based on defined MO recognition patterns. The MOs and any unrecognized NSEs are uploaded to the network monitoring system, where they are further analyzed by a MA recognition engine to recognize higher-level machine activities performed in the network. The NSEs, MOs, and MAs are used by the network monitoring system to implement a variety of security threat detection processes. By recognizing raw network event data into machine activity data, the interpretation pipeline adds rich contextual information about the data to aid the security threat detection processes and present the data in intuitive user interfaces. In some embodiments, recognized MOs and MAs are cataloged in a library that can be continuously updated based on crowd-sourcing from users in individual client networks.

BRIEF DESCRIPTION OF THE DRAWINGS

FIG. 2A illustrates network sensor events observed in a client network as a result of a downloading of a webpage on a machine, according to some embodiments.

FIG. 2B illustrates a machine operation recognized in a client network based on a sequence of network sensor events, according to some embodiments.

FIG. 2C illustrates a machine activity recognized in a client network based on a sequence of machine operations and network sensor events, according to some embodiments.

FIG. 2D illustrates an entity session in a client network generated from a group of machine activities, machine operations, and network sensor events observed for a particular machine, according to some embodiments.

FIG. 7 is a flowchart illustrating a process of recognizing and uploading machine operations performed by a machine operation recognition engine implemented in a network data interpretation pipeline, according to some embodiments.

FIG. 8 is a flowchart illustrating a process of recognizing machine activities performed by a machine activity recognition engine and using the machine activities to detect security threats in a client network, according to some embodiments.

Figure 1:
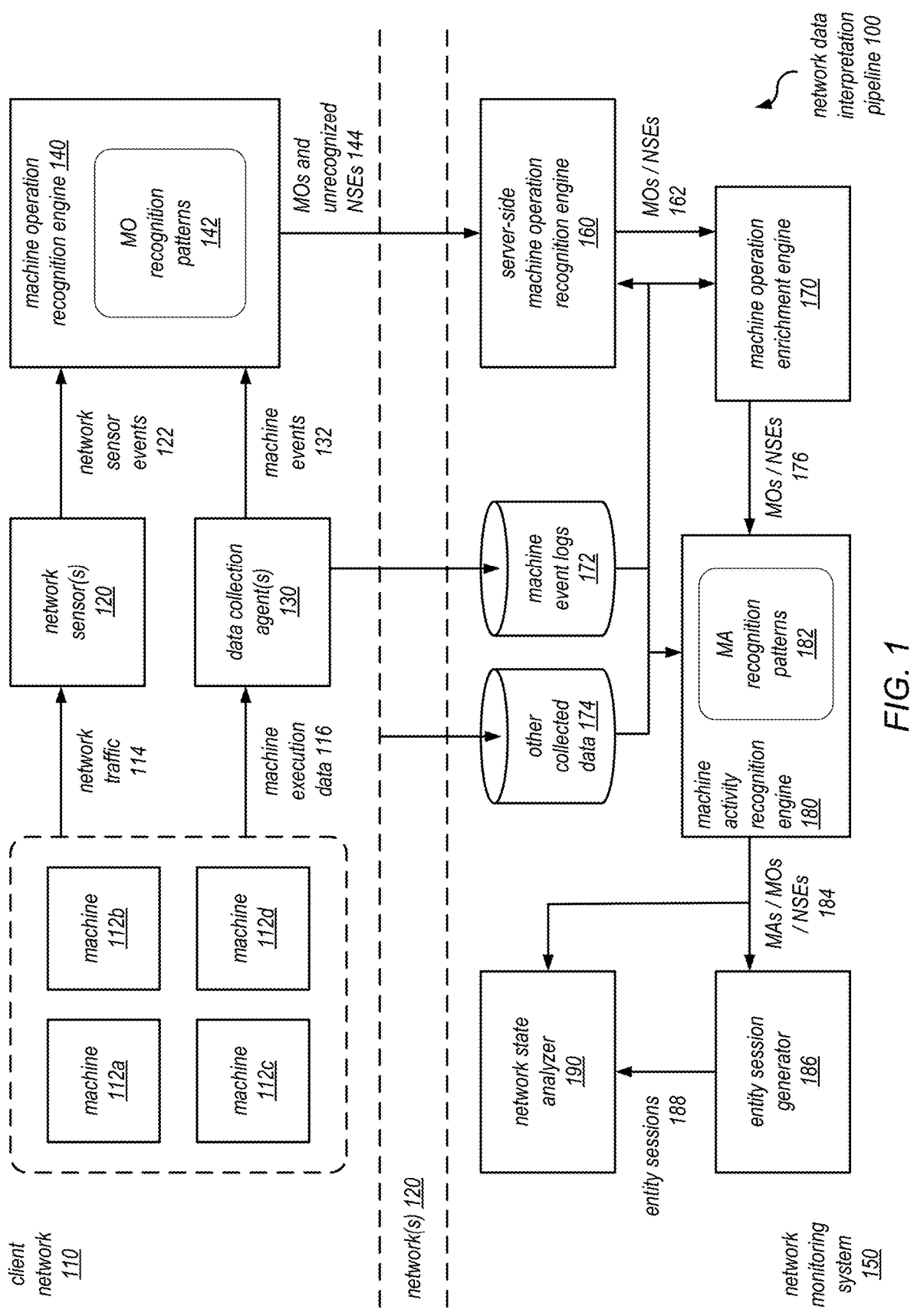
FIG. 1 is a block diagram illustrating a network data interpretation pipeline configured to recognize machine operations and machine activities based on network sensor events observed in a client network, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Modern network monitoring systems employ network sensors in client networks to collect network metadata about the client networks, which may be analyzed for signs of cybersecurity threats. A network sensor connected to a large network can generate a huge amount of network sensor events based on observed network traffic. The events capture details about the network traffic such as the timing of individual network communications, the source and destination of the communications, the network protocols used, the amount of data transmitted and received, among other types of metadata.

However, while the collected metadata describes characteristics of network traffic flows, it does not directly indicate the actual actions of the users and machines in the network that triggered the sensor events. Considerable technical knowledge is required to interpret the events to convert them to a usable form for network security analysis. The volume of the collected events makes it extremely difficult for human analysts to filter through the data to quickly identify security threats. Moreover, the routine uploading of large amounts of network metadata generated by the network sensors is extremely wasteful in terms of resource usage, and the uploads themselves can raise additional security concerns. In addition, current network monitoring systems are generally configured to focus on undesirable behavior in client networks to look for patterns of known security threats. This approach can leave detection gaps in situations where an attacker uses a novel attack method that does not produce an anticipated traffic pattern.

To address these and other problems of current network monitoring systems, systems and methods described herein may be employed in various combinations and embodiments to implement a network data interpretation pipeline to interpret network sensor events (NSEs). Embodiments of the pipeline are configured to classify sequences of NSEs into a hierarchy of human-friendly data structures that represent machine operations (MO) on individual machines in the client network. Series of MOs will be further grouped by the pipeline into higher-level machine activities (MAs). In some embodiments, the NSEs, MOs, and MAs associated with an entity (e.g. a single user or a machine) and occurring within a specified time period (e.g. a single day) may be aggregated into an entity session (ES), which can be presented for display on a graphical user interface (GUI) with human-readable labels and descriptions.

In some embodiments, the network data interpretation pipeline may implement a machine operation recognition engine (MORE) in the client network that is capable of interpreting NSEs from a network sensor to accurately identify MOs. The MOs may be recognized based on sequences of NSEs and possibly other MOs. Moreover, in some embodiments, the MOs may be recognized by correlating them with data from other data sources, such as logs of machine events captured on the individual machines. In some embodiments, the MOs may be uploaded over a public network to the network monitoring system, which may implement a machine activity recognition engine (MARE) to identify MAs based on the MOs.

As an example, when a user opens a website www.example.com on a browser, a series NSEs (e.g. DNS events, IP flow events, HTTP events, etc.) may be generated by one or more network sensors as a result. The MORE will monitor the event stream from the sensor(s) to recognize the events as a single MO "Download Webpage www.example.com/index.html." Thus, a MO will represent a single operation executed on a machine that caused the recognized sequence of events. In some embodiments, the recognized MOs along with any unmatched NSEs are uploaded to the network monitoring system, which may be a cloud-based platform accessible over a public network. In some embodiments, the MOs may be uploaded to the network monitoring system instead of the raw NSEs that correspond to these MOs, so that the amount of data uploaded is significantly reduced. At the network monitoring systems, groups of one or more MOs will be recognized as MAs. Using the same example, multiple "Download Webpage" MOs associated with the same website may be grouped to recognize a higher-level MA "Browse Website www.example.com."

As another example, when the user opens a shared SMB file on a WINDOWS machine over the network, the action may generate a number of NSEs due to the SMB transactions between the client (e.g. WINDOWS EXPLORER) and the server. The MORE may be used to identify such NSEs and group them into a "Load Shared File" MO. Multiple "Load Shared File" MOs to a same file repository or server may be recognized as a "Browse Shared Files" MA.

In some embodiments, the pipeline may be able to recognize more complex MAs involving multiple communication protocols and more than two network entities. For example, in some embodiments, the recognized MOs and MAs may be enriched with additional contextual data that allows related MOs and MAs to be linked across multiple machines, multiple users, multiple time periods, etc. The contextual data may be obtained from other sources such as machine event logs, asset information repositories, user information repositories, and the like. Based on such information, the interpretation pipeline may be able to detect, from a set of related MOs across different machines, a type of data exfiltration activity in the client network. In some embodiments, the pipeline may implement sophisticated rules or machine learning models to directly detect many types of malicious MAs.

One key advantage of the interpretation pipeline is that the classification it performs provides a natural method for detecting unusual activities in the client network. The object model allows a vast majority of normal network traffic to be recognized as defined MOs and MAs, so that any remaining unrecognized network traffic events can be automatically flagged as anomalies. As the analysts review the unrecognized events and configure the pipeline to properly classify the events, the pipeline' library of known MOs and MAs can be improved over time. Additionally, in some embodiments, the pipeline may allow users to contribute new types of MOs or MAs to its global library, so that the pipeline's knowledge base can be continually expanded.

In some embodiments, the network monitoring system may group the MAs and any unmatched MOs and NSEs into an individual entity session (ES), which is associated with a particular entity (e.g. a machine or a user) over a particular span of time (e.g. a particular day). In some embodiments, the MOs and MAs may be associated with unique names that describe the operation or activity being represented by the data objects. In some embodiments, these descriptive names may be used for additional programmatic process by other computer systems, for example, to generate more descriptive labels such as "User Joe browses the web," User Jane prints document," "Printer X deletes shared file F," etc.

In some embodiments, the interpretation pipeline will keep track of the ESs for different entities (e.g. users or machines), and use the ESs to continuously build and update entity profiles for anomaly detection. For example, if a machine profile is not commonly associated with a particular type of MO "Delete Shared File," an observation of this MO on the machine may trigger an alert. In some embodiments, the MOs and MAs generated by the interpretation pipeline may be used to build generalized profiles for different entities and used to perform User and Entity Behavior Analysis (UEBA) on the entities. In some embodiments, a profile may be built for a particular network sensor in the client network, or even a group (possibly all network sensors feeding into the network monitoring system). These sensor profiles may be used to detect anomaly conditions at individual sensors or the entire group of sensors. Use of multiple types of profiles (in addition to UEBA profiles) reduces the risk that an attack will escape detection by disguising its network patterns to appear normal.

In some embodiments, generated entity sessions may be presented on one or more GUIs implemented by the network monitoring system so that analysts can visualize the collected network metadata in terms of actual activities performed in the network. For example, an ES may be presented in the GUI with human-readable labels and descriptions (e.g. in a natural language such as English). NSEs or MOs that were not recognized as part of any MA may be labeled accordingly in the GUI. The GUI thus allows analysts to easily filter through the majority of the collected data that represent normal activities in the network, so that they can focus their attention on unrecognized activities that should be inspected further. In some embodiments, the pipeline may be designed for continuous learning and improvement, so that unknown activities can be gradually cataloged and subsumed into the pipeline's library as defined MOs and MAs. At the same time, the pipeline is able to continuously recognize known activities in the library and provides its interpretation results to a wide audience in real time.

In some embodiments, the MOs and MAs recognized by the pipeline may be stored long term, potentially for the lifetime of a customer, and used to generate useful summaries for the monitored client network. For example, historical MOs and MAs seen in a client network may be used to answer queries or generate summary reports. Summary reports may provide useful information such as "1024 users visited a total of one million web pages in the past six months."

The disclosed network data interpretation pipeline provides a number of technical benefits to improve the functioning of current network monitoring systems. In one respect, recognition of low-level MOs may be performed at the client network (at least partly), which results in a significant reduction in the amount of data that is uploaded to and processed by the network monitoring system. Accordingly, the interpretation pipeline can provide significant savings for clients in terms of resource usage (e.g. network bandwidth used by the client network and associated data ingress, storage, and processing costs at the network monitoring system).

In another respect, the interpretation pipeline effectively organizes raw NSEs into semantically meaningful data objects such as MOs and MAs, which enable more accurate detection of security risks by the network monitoring platform. In some embodiments, the recognized MOs and MAs may be used as the basis to create entity profiles for entities in the client network to provide new angles of threat detection with less effort and cost.

In another respect, the recognized MOs and MAs are better suited for human inspection, allowing the human analysts to gain greater visibility and insights into actual activities occurring within the client network. In some embodiments, NSEs or MOs that cannot be recognized by the pipeline as part of a larger activity can be automatically flagged as potentially anomalies in the client network.

In another respect, embodiments of the interpretation pipeline may provide a crowdsourcing mechanism that allows users to contribute to the pipeline by submitting updates to a global library of MOs and MAs. The crowdsourced library will provide a superior user experience for clients, who will be able to receive regular updates to their local recognition engines based on changes to the library, to keep the local recognition engines up-to-date on novel types of activities seen in the wild. These and other features and benefits of the disclosed thread sensor generation system are described in further detail below, in connection with the figures.

FIG. 1 is a block diagram illustrating a network data interpretation pipeline configured to recognize machine operations and machine activities based on network sensor events observed in a client network, according to some embodiments.

As shown, the network data interpretation pipeline 100 is divided into two portions, where some components of the pipeline are implemented in client network 110, and other components are implemented in the network monitoring system 150. As shown, the client network 110 includes many machines 112*a-d*, which may be various types of computers (e.g., workstations, laptops, servers, etc.) or other types of networked equipment (e.g., printers, storage devices, IoT devices, etc.) In some embodiments, some of the machines may be virtual machine or container instances hosted on physical hosts. As shown, the machines 112*a-d* may communicate with each other over the client network 110, and the resulting network traffic 114 between the machines is observed by one or more network sensors 120. The network sensors 120 are configured to generate network sensor events 122 based on the observed network traffic 114.

In some embodiments, the network sensors 120 may be implemented at various data collection points within the client network 110. For example, some types of network sensors may be implemented by special hardware appliances. Some network sensors may be implemented as software on some of the machines 112 or on networking devices such as switches and routers. In some embodiments, the network sensors may be implemented as virtual machine instances. In some embodiments, a networking device in the client network may implement a mirror port that sends a copy of the network traffic passing through the networking device (and/or associated network metadata) to a network sensor. In this manner, collection of the network traffic will not significantly impact actual communications among the machines 112.

The NSEs 122 may be generated by the network sensor(s) to capture different types of metadata about the network traffic 114. In some embodiments, the network sensors may generate a type of network flow event, which indicates the total amount of data exchanged between two Internet Protocol (IP) addresses, which may or may not be machines in the client network 110. In some embodiments, another application event that may be generated, which identifies the high-level protocol of communications at or near the application layer in the Open Systems Interconnection (OSI) model. For example, one type of application event may correspond to a Domain Name Service (DNS) lookup or for a HyperText Transfer Protocol (HTTP) request. In some embodiments, the DNS event may be generated only when a DNS request is observed with a DNS response, so that the event corresponds to two or more network communications from two different network entities. As another example, another type of application event may represent a port scan, where one host makes successive connection attempts to multiple ports on another host. The network data interpretation pipeline 100 implements a machine operation recognition engine 140 (MORE) that will interpret these NSEs 122 and attempt to classify sequences of NSEs to machine operation (MO) data objects.

In some embodiments, each MO object will correspond to an action or operation on a machine in the client network (e.g. a user action) that caused a sequence of NSEs. Each MO may be associated with a name and other attributes indicating its properties or features. The MO name may be a unique identifier, and may include a human-readable description of the type of MO.

In some embodiments, the recognition process performed by the MORE 140 may first organize the observed NSEs into related groups using the events' flow ID, source or destination IP addresses, and/or timestamps. In some cases, the NSEs may be further grouped according to their protocol type. In some embodiments, the resulting groups or sequences of NSEs are matched against a set of MO recognition patterns 142 that correspond to different MO types recognized by the MORE 140. These recognition patterns 142 may be specified in terms of individual matching rules. The matching rules may include various parameters that control how the rules should be applied. For example, the matching rule parameters may specify that some matching attributes (e.g. NSEs) are required, while other attributes are optional. Some matching rule parameters may specify a particular order of NSEs in the observed NSE sequence. Another matching rule parameter may specify that a composite MO can be recognized based on a sequence of smaller component MOs. Another parameter may specify the maximum interval of time of the sequence. In general, the matching rule parameters can specify a variety of matching conditions for recognizing NSE sequences as MOs.

In some embodiments, the MORE 140 will search through a catalog of MO types by matching the features of the NSEs against the features of the MOs. For each match, the order may be recorded. The MORE may check the NSEs to see if all required features for a MO type are present, in the required order, and occurring in the maximum time interval, etc. If so, the MORE will generate a MO data object and populate the object with attribute values gathered from the matched NSE sequence. In some embodiments, the newly generated MO is used as input to the MORE for recognizing larger MOs. In some embodiments, this matching or recognition process will repeat recursively until no further recognitions are possible.

As one example, a DNS NSE may be recognized by the MORE to generate a DNS MO. However, the MORE may further recognize that the DNS MO can be combined with subsequent HTTP NSEs to produce a larger "Get Web Object" MO. These "Get Web Object" MOs may in turn be further aggregated to produce a "Download Webpage" MO, where the downloaded webpage includes the downloaded web objects.

In some embodiments, instead of individual matching rules, the MORE may encode the MO recognition patterns 142 in one or more machine learning models trained to classify NSE sequences into MOs. In some embodiments, the recognition process may be performed partly using individual matching rules, and partly using machine learning models. Depending on the embodiment, different types of machine learning models may be used for classifying the NSE sequences, including K-Nearest Neighbor models, Hidden Markov Models (HMMs), Convolutional Neural Networks (CNNs), Recurrent Neural Networks (RNNs), and the like. In some embodiments, these machine learning models may be trained using supervised learning with labeled NSE sequences, and periodically pushed to the client network for deployment.

In some embodiments, a count-based model may be used to recognize MOs from sequences of NSEs. The count-based model will keep track of the order of the observed features of NSE sequences (e.g. NSEs) during training. With each observed NSE in a training sequence, the count for the feature being at the observed position is increased. The count may be weighted (e.g., multiplied by a factor to be chosen by the model developer), so that some features will have more influence over the recognition process than others. In some embodiments, the count-based model will store the count values obtained from training for each MO type, as well as the maximum score, which is achieved by a perfect match with the longest sequence.

In some embodiments, the training dataset will be chosen so that it is representative of the frequency of occurrence of various MOs. The training dataset may sample observation records proportionally according to actual observation frequencies, so that it will reflect a more realistic representation of NSEs in the client network.

During model execution, the counts stored by the model will be matched against new observations (new NSE sequences) to obtain a score that indicates how well a new NSE sequence matches a given MO type. In practice, matching may be more complex because NSEs may arrive in a stream which is not automatically labelled with an order. One simple algorithm to infer an ordering would be to simply assume that the first NSE in the stream is also the first one in the sequence to be matched. In some embodiments, if the match score from the counts do not meet a minimum threshold, this means that the sequence of NSEs do not match the MO type. In some embodiments, the model may maintain count data for many different types of MOs and check the incoming NSE sequence against all MO types to determine the best match.

As shown, in some embodiments, the MORE 140 may use a second source of information to recognize MOs. In particular, embodiments of the MORE 140 may use machine events 132 generated by data collection agents 130. These agents 130 may be deployed on the machines 112. In some embodiments, the MORE may access the machine events from event logs stored on the individual machines. In some embodiments, the MORE may receive the machine events directly from the individual data collection agents. In some embodiments, the MORE may be implemented on the individual machines alongside the data collection agents.

The agents 130 may be configured to monitor the machines and collect, as machine events, certain machine execution data 116 from the machines. For example, the machine events 132 may indicate information such as what programs or processes were executed on the machines, and various properties of the executions including the name of the executable, the time of execution, the user associated with the execution, the time length of execution, the amount of network data sent or received during the execution, etc. As shown, in some embodiments, the machine events may be sent to the network monitoring system 150 and stored in machine event logs 172, to be used for centralized processing.

In some embodiments, the machine events 132 may be matched to sequences of NSEs, for example, based on the timing and machine IP addresses indicated in the two sources of data. In some embodiments, the data in the machine events 132 may be used as additional input features for the machine learning models maintained by the MORE. When a NSE sequence is successfully matched to one or more machine events on a particular machine, the MO will be linked to the one or more machine events. In this manner, the MORE is able to populate the MO with the additional information provided by the machine events, such as the executable that performed the MO, the user associated with the MO, etc. In some embodiments, the MORE will use the information to determine a group of related MOs that were performed by a single execution of a program and link these MOs.

As shown, recognized MOs 144 are transmitted over the network(s) 120 to the network monitoring system 150. In some embodiments, the MOs are sent along with any unrecognized sequences of NSEs, so that a server-side MORE 160 can have another opportunity to recognize additional MOs from these NSEs. In some embodiments, the server-side MORE 160 may have access to more context data to make more sophisticated recognitions. In some embodiments, the server-side MORE may have a larger library of MOs than the client-side MORE.

In various embodiments, the network(s) 120 may encompass any suitable combination of networking hardware and protocols necessary to enable communications between the client network 110 and the network monitoring system 150. In some embodiments, the machines 112 may execute in a private network of a company, behind a company firewall, and the network 120 may include a public network such as the Internet, which lies outside the firewall. The network 120 may encompass the different telecommunications networks and service providers that collectively implement the Internet. In some embodiments, the network 120 may also include private networks such as private local area networks (LANs), private wide area networks (WANs), or private wireless networks. The network 120 may be implemented using different hardware (e.g., modems, routers, switches, load balancers, proxy servers, etc.) and software (e.g., protocol stacks, routing software, firewall/security software, etc.) for establishing networking links between the MORE 140 and a data receiving interface of the network monitoring system 150. In some embodiments, the transmitted data (e.g. the MOs and unrecognized NSEs 144) may be sent to the network monitoring system using one or more secure communication channels such as transport layer security (TLS) connections implemented over the network 120.

As shown, in some embodiments, a server-side MORE 160 is implemented to make a second pass at unrecognized NSEs uploaded from the client network. As discussed, the server-side MORE 160 may have more sophisticated recognition rules or models, more contextual data, or more defined MO types, so that it can sometimes recognize additional types of MOs that the client-side MORE cannot. In some embodiments, the server-side MORE may make more sophisticated use of other sources of data such as the machine event logs 172, server logs, asset inventory data, user data, etc. In some embodiments, the machine event logs 172 are of particular importance, because they can be used to determine the origin of an NSE. For example, on LINUX systems, the host command can be used to lookup the IP address of a domain. This command will generate a DNS lookup event. However, in some embodiments, the client-side MORE is only implemented with simple recognition patterns that recognize the DNS MO from the NSEs. However, the server-side MORE can match this DNS MO with a process on a source machine at a near timestamp, to generate a more specific type of MO "CLI Domain Lookup."

As shown, the resulting MOs recognized from this process and any still unrecognized NSEs 162 are passed to the next stage of the interpretation pipeline, which is a machine operation enrichment engine 170 (MOEE). In some embodiments, the MOEE 170 is used to perform a variety of data enrichment, cleaning, normalization, and transformation tasks on the MO stream. In some embodiments, the MOEE module may be used to make a correlation between the different MOs in the stream, which can be captured as training data for more sophisticated recognition models. For example, in some embodiments, when the MOEE observes MOs between a pair of entities, it will look for similarities in the amount of data exchanged between the pair and other pairs of entities in the client network. For entity pairs with similar amounts of data exchanged, their MOs may be marked with an attribute indicating the similarity. This attribute could be of relevance when training a recognition model to recognize data exfiltration in the client network.

In some embodiments, the MOEE 170 may assign a more generalized category or type to a specific type of MO. For example, a first MO "Copy File Over SMB" and a second MO "Copy File Over NFS" may both be assigned to the more generalized category "Copy Shared File," which will be attached to the MOs for downstream processing or model training. In some embodiments, the generalized category will allow missing MOs in the training data to be replaced with similar MOs found elsewhere.

In some embodiments, the MOEE 170 may transform a quantitative value in one attribute into a categorical one in another attribute. For example, the MOEE may examine a timestamps value for two or more MOs and populate a MO attribute to indicate that the timestamps are "close enough." In some embodiments, these types of transformations are performed as part of a featurization process performed on MOs before they are used for training of machine learning models.

In some embodiments, the MOEE 170 may enrich the MOs in the stream with relevant data from other types of collected data 174, such as server event logs, other agent logs, asset inventory information, user information, etc. For example, one example of a data enrichment attribute may be a "user type" attribute that indicates whether a MO was initiated by an administrator, whether the user is recently created, etc. Another example attribute may indicate whether the MO was executed on a machine that has recently received a security update.

In some embodiments, the MOEE 170 may perform a form of user tracking to track when a user performs multiple successive MOs across a series of machines. User tracking may be performed, for instance, by correlating information from logs or SSH transactions between machines. The MOEE may populate one or more attributes in the MOs to indicate that they are a sequence of related operations performed by a single user. In some embodiments, the MOEE 170 may introduce context to the MOs in the form of previous MOs or network activities associated with the same user or machine and populate attributes in the MOs to indicate such associations.

As shown, the enriched MOs and any unrecognized NSEs 176 are then provided to a next stage in the interpretation pipeline, which is a machine activity recognition engine 180 (MARE). The MARE 180 will recognize machine activities from the stream of MOs and NSEs 176. A machine activity (MA) is a grouping of MOs and NSE on a particular machine and represents a higher-level activity that took place on the particular machine. The MA may correspond to a series of related MOs and NSEs, and possibly other MAs. As shown, the MARE 180 will recognize the MAs based on a set of MA recognition patterns 182. Similar to the MO recognition patterns 142, the MA recognition patterns 182 may be implemented using matching rules or machine learning models. In some embodiments, the MAs may be recognized in a similar manner as discussed for the client-side MORE 140 and server-side MORE 160. As shown, the MAs may be recognized based on contextual data, such as the machine event logs 172, or other data 174 collected from the client network, such as server logs, asset inventory data, user data, etc.

As with MOs, each MA may be associated with a name and a data model that defines its attributes. In some embodiments, the MA's name may be a unique name that describes the MA in a human-readable description. The NSEs and MOs that are used to recognize the MA may be considered part of the MA, and information about the NSEs and MOs are used to populate the attributes of the MA data object. The output of the MARE 180 is a stream of recognized MAs and unrecognized MOs and NSEs 184.

As shown, the stream of MAs, MOs, and NSEs 184 may next be provided a network state analyzer component 190, which will use the stream to perform a variety of analysis on the client network. The analysis may be performed continuously in order to monitor the client network for signs of cybersecurity threats. Types of cybersecurity threats monitored by the network monitoring system may include a variety of conditions or activities in the client network, such as unauthorized intrusions, inappropriate resource usage or access, data exfiltration, deployment of malware, or various network configurations or conditions that indicate potential vulnerabilities for different types of cyberattacks.

As shown, in some embodiments, the output stream 184 of the MARE 180 may be processed by an entity session generator 186 to generate entity sessions 188 (ESs), which are also consumed by the network state analyzer 190 to analyze the network's behavior. An individual ES will represent a collection of MAs, MO, and NSEs that are associated with a single entity (e.g. a particular user or machine) that occurred within a specified period of time (e.g. a 24-hour period). In some embodiments, the ESs may be generated on demand. In some embodiments, the entity session generator 186 will automatically and continuously generate ESs for each entity and each time period. In some embodiments, a default time period of 24 hours is used by the generator because human and machine activities tend to repeat in a fairly regular manner every day. However, in some embodiments, the manner in which the ESs 188 are generated is configurable via a configuration interface of the pipeline. In some embodiments, the ESs may be presented on a graphical user interface, so that security analysts can easily view the activities of different entities for different time periods.

The network state analyzer 190 may employ a variety of different methods to monitor the client network for cybersecurity threats. In some embodiments, the analyzer may flag unrecognized MOs and NSEs as anomalies so that they can be investigated by security analysts. If the investigation reveals that the unrecognized MOs and NSEs are actually part of a benign MA, the recognition patterns of the MA may be updated so that future observations of these MOs and NSEs will be properly recognized. In some embodiments, the pipeline may implement recognition patterns for particular types of MOs and MAs that are known to be associated with malicious or undesired behavior in the client network. Mitigation actions may be triggered when these types of undesired MOs and MAs are observed. In some embodiments, the analyzer may use the MOs and MAs to construct different types of network state objects for different entities in the client network. These network state objects will represent a snapshot of the entity during a short timespan (e.g. five minutes). The network state may be generated periodically and compared to profiles associated with the entities to determine whether the current state of the entity represents an anomaly. Detected anomalies will cause the network monitoring system to generate security events or alerts.

As will be appreciated by those skilled in the art, by converting the collected network sensor events 122 into sequences of MAs and MOs, the network data interpretation pipeline is able to add rich semantic and contextual meaning to the raw sensor event data. This added information greatly enhances the network state analyzer's ability to detect cybersecurity threats in the client network.

FIG. 2A illustrates network sensor events observed in a client network as a result of a downloading of a webpage on a machine, according to some embodiments. The network sensors events 210 shown in the figure are an example of the network sensor events 122 of FIG. 1.

As shown in this example, the NSEs 210 are generated by the downloading of a single webpage, for example, in response to one or more user actions on a web browser. As shown, NSEs 212 and 214 indicate a DNS request and a DNS response for the domain name "xyz.com." The two NSEs also indicate additional information such as the timestamp of the observed events, the source and destination IP addresses of the communications, the queried domain name, and the returned IP address. As shown, later in the NSE stream, another NSE 216 is observed, which indicates an IP flow from the same source address to the destination address "88.131.99.25" returned by the DNS response 214. As discussed, while these NESs include large amounts of technical information, they do not directly indicate the underlying machine operation that caused the events. Moreover, some network sensors can generate large volumes of these NSEs (e.g. up to hundreds of events for a single webpage download), resulting in a large amount of data to be uploaded to and processed by the network monitoring system.

Accordingly, embodiments of a machine operation recognition engine (e.g. MORE 140 of FIG. 1) is configured to recognize such a sequence of the NSEs as a single machine operation. As discussed, the recognition may be performed based on a set of MO recognition patterns, which may be implemented as a set of matching rules, one or more machine learning models, or both. For example, the recognition may first group the NSEs 210 into a NSE sequence based on the source IP address and their timestamps. The NSE sequence may then be evaluated against MO recognition patterns to determine that the sequence corresponds to an action on the machine to download a webpage.

FIG. 2B illustrates a machine operation recognized in a client network based on a sequence of network sensor events, according to some embodiments. The MO 220 shown in this figure may be an example of the MOs 144, 162, 176, or 184 discussed in connection with FIG. 1.

As shown, the machine operation 220 identifies a recognized operation that took place in a machine in the client network. As discussed, a MO may be recognized from a sequence of NSEs and possibly other recognized MOs. In some embodiments, a MO may be recognized based on other sources of data such as machine events generated by data collection agents, which may be matched to a sequence of NSEs based on their timestamps and machine IP addresses. In some embodiments, once a MO type is recognized by the MORE, a MO data object will be generated according to the MO data model, and the object will be populated with data gathered from the NSEs and other sources of data.

As shown, the MO data object 220 includes a number of data attributes. Attribute 222 indicates an operation name of the MO. The operation name may be unique for each type of MO and indicates a description for the type of MO in a natural language such as English. In this example, the operation name 222 indicates that the MO represents the downloading of a webpage and also identifies the particular webpage that was downloaded. In some embodiments, the downloading of different webpages may correspond to different MO types that are associated with different MO recognition patterns. As another example, another type of MO may be used to represent a remote file access, and the operation name of the MO may identify the particular file that was accessed.

As shown, the attribute 224 indicates an operation ID, which may be a unique identifier that identifies this particular instance of MO. The MO object in this example also indicates the source IP address of the machine that generated the MO, the source MAC address of the machine that generated the MO, the destination IP address of the primary destination of the MO (e.g. the web server providing the webpage), the destination MAC address of the primary destination of the MO (if available), the start time of the first event (NSE or machine event) associated with the MO, the end time of the last event associated with the MO, the total number of bytes sent from the MO's source address, the total number of bytes received by the MA's source address, and a username of a user that initiated the MO.

In addition, the machine events attribute 226 may be used to indicate a list of associated machine events that may have been provided by data collection agent logs. For example, the associated machine events may indicate relevant commands that were executed to initiate the MO or processes that were responsible for executing the MO. As shown, the network sensor events attribute 228 in this example indicates a summary of the NSEs associated with the MO, for example, the sequence of NSEs that caused the recognition of the MO. As shown, the network flows attribute 230 indicates a summary of the network flows associated with this MO, including the protocols used, the destinations IP addresses and ports, the bytes sent to and received from each IP address, etc. As shown, the flow countries attribute 232 in this example indicates the geographic locations associated with some of the destination IP addresses in the network flows. In some embodiments, the values of some attributes may be represented using a formatted text string, which can be parsed by downstream consumers of the MO data object. In some embodiments, certain attributes such as the username and the flow countries may be determined by cross-referencing the MO data with other sources of data.

FIG. 2C illustrates a machine activity recognized in a client network based on a sequence of machine operations and network sensor events, according to some embodiments. The MA 240 shown in this figure may be an example of the MAs 184 discussed in connection with FIG. 1.

As shown, the machine activity 240 identifies an activity that was performed on a machine in the client network. The MA groups a series of related MOs and possibly NSEs into a unit, according to a MA recognition pattern. In some embodiments, the information contained in the MA data object may be populated based on information in the corresponding MO and NSEs, and possibly from other data sources. For example, as discussed in connection with FIG. 1, the MARE may use other data sources 172 and 174 to enrich the MA data during the MA recognition process.

As shown, the MA data object 240 includes a number of data attributes. Attribute 242 indicates an activity name of the MA. The activity name may be unique for each type of MA and indicates a description for the type of MA in a natural language such as English. In this example, the activity name 242 indicates that the MA represents the browsing of a website and also identifies the particular website that was browsed. In some embodiments, the browsing of different websites may correspond to different MA types that are associated with different MA recognition patterns.

As shown, the attribute 244 indicates an activity ID, which may be a unique identifier that identifies this particular instance of MA. The MO object in this example also indicates the source IP address of the machine that generated the MA, the source MAC address of the machine that generated the MA, the destination IP address of the primary destination of the MA (e.g. the web server hosting the website), the destination MAC address of the primary destination of the MA (if available), the start time of the first MO or NSE associated with the MA, the end time of the last MO or NSE associated with the MA, the total number of bytes sent from the MA's source address, the total number of bytes received by the MA's source address, and a username of a user that performed the MA.

Additionally, in this example, the machine events attribute 246 provides a summary of machine events associated with the MA. As discussed, the machine events may be generated by the data collection agent 130 of FIG. 1 and may indicate information such as commands executed in the machine that coincided with the execution of the MA. As shown, the MA object also includes a network sensor events attribute 248. In some embodiments, this attribute may provide a summary of any NSEs associated with the MA that were not recognized as MOs. Finally, in this example, the MA object includes a machine operations attribute 249, which indicates the MOs associated with the MA. The list of MOs may be the sequence of MOs that caused the recognition of the MA.

FIG. 2D illustrates an entity session in a client network generated from a group of machine activities, machine operations, and network sensor events observed for a particular machine, according to some embodiments.

As shown, the entity session 250 represents a summary of all MAs and MOs not recognized as MAs that occurred on a machine within a span of time. In some embodiments, the ES may also include NSEs that occurred on the machine within the timespan. The attributes of the ES may be extracted from the associated MAs and MOs. The ES may be generated by a component such as the entity session generator 186 of FIG. 1, which may be configured to generate ESs continuously for specified entities in the client network. As discussed, these ESs may be provided to a network state analyzer component for analysis or displayed on a graphical user interface for security analysts.

As with the MO and MA objects discussed previously, the ES 250 object contains a number of data attributes. In this example, the session ID 252 represents a unique identifier for the ES. In some embodiments, the session ID may be constructed based on a combination of a timestamp, a globally unique identifier of the client network, and a unique identifier of the entity within the client network (e.g. a user ID or a machine IP address). The start time 254 and end time 256 represent the boundaries of the timespan associated with the ES. As shown in this example, ES 250 corresponds to a particular 24-hour period. The entity IP 258 indicates the IP address associated with the entity, which in this case is a machine. In this example, the machine is associated with two different MAC addresses, which may correspond to two different network interfaces on the machine. The users attribute indicates all the users that initiated a NSE, MO, or MA during the ES. The bytes send and bytes received attribute indicate the amount of data sent and received by the entity during the ES. In some embodiments, the ES may also include a machine events summary that indicates machine events (e.g. commands or processes on the machine) that coincided with the ES. Finally, in this example, a session summary attribute 260 is included to provide a summary listing of all the MAs, MOs, and NSEs that correspond to the ES. In some embodiments, the ES, MA, and MO objects may together implement a hierarchical data model, where one object may include links or pointers to other objects. Consumers of these objects (e.g. the network state analyzer 190) will implement the parsing logic to traverse the hierarchical object model.

Figure 3:
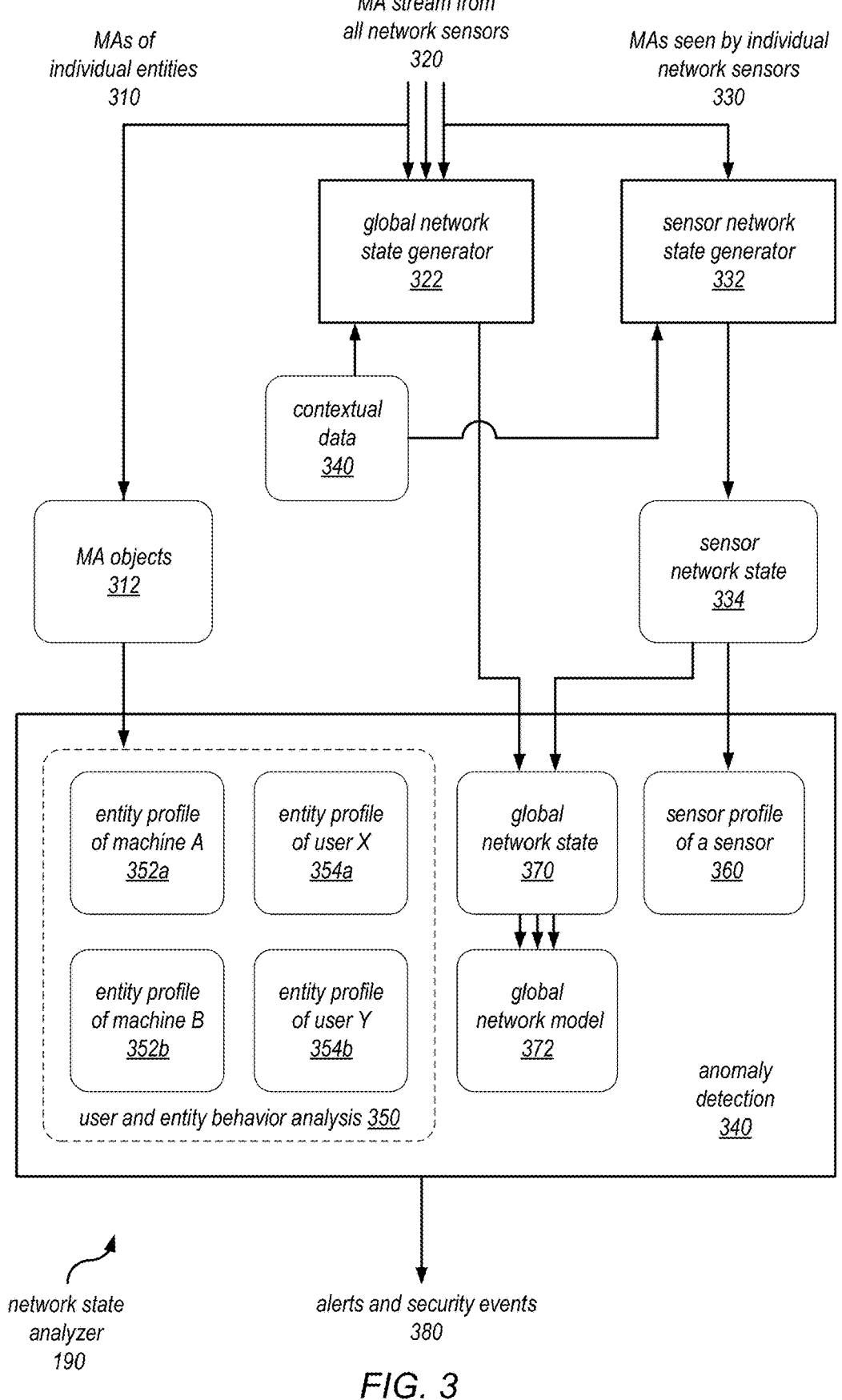
FIG. 3 illustrates components of an anomaly detection system implemented based on machine operations and machine activities recognized by a network data interpretation pipeline, according to some embodiments.

FIG. 3 illustrates components of an anomaly detection system implemented based on machine operations and machine activities recognized by a network data interpretation pipeline, according to some embodiments. As shown, the illustrated components may be implemented as part of the network state analyzer 190 of FIG. 1.

As shown, the anomaly detection system 340 is implemented as a component of the network state analyzer 190 (NSA) of FIG. 1. The anomaly detection component is configured to examine different types of data objects. The data object may be MA objects 312 generated by the network data interpretation pipeline, or sensor network state objects 334 constructed from the MA objects. The anomaly detection system is configured to detect anomaly conditions in the client network based on these data objects.

As shown, one form of anomaly detection is performed based on the MAs of individual entities 310 (e.g. a particular user or machine in the client network). For example, the MAs 312 of one entity may be submitted to a user and entity behavior analysis (UEBA) system 350 for analysis. The UEBA component may maintain profiles of different entities, such as machine profiles for individual machines 352a-b, and user profiles for individual users 354a-b. An incoming MA 312 will be checked against the profile(s) of its corresponding entity, and any anomalous activity detected based on the profile(s) will cause an alert or security event 380 to be generated. For example, if a user who never performs an "Access File" activity for a particular file is observed to perform that activity all of a sudden, the activity may trigger a security event from the NSA. In some embodiments, instead of evaluating an individual MA for anomalies, the anomaly detection component may evaluate entire entity sessions (ESs). Depending on the embodiment, the anomaly detection may be performed by a variety of suitable algorithms (e.g. machine learning algorithms), including Random Cut Forests, clustering algorithms, and the like. In some embodiments, the generated security event 380 may indicate the particular MA 312 or ES that was identified as the anomaly.

Besides profiling MAs and ESs using UEBA analysis, in some embodiments, the anomaly detection system may also be configured to evaluate sensor network states 334 (SNS) using sensor profiles 360. In some embodiments, a sensor network state 334 is generated by a sensor network state generator 332, which aggregates the MAs 330 seen by one network sensor during a particular time period. For example, the SNS 334 may indicate a summary of all MAs observed by a sensor in the last five minutes. In some embodiments, the summary may indicate respective counts of different types of MAs observed during the period, or other types of summaries (e.g. a total amount of data uploaded/downloaded, an average activity time length, etc.). The SNSs may be generated continuously for successive time periods and be used to build a sensor profile 360 of the sensor to indicate an expected pattern of MAs seen by the sensor. When a new SNS 334 deviates from the sensor profile 360 based on some specified detection criteria, a security event or alert 380 will be generated.

Additionally, in some embodiments, the anomaly detection system may generate a global network state (GNS) 370 using a global network state generator 322. The GNS 370 may aggregate a summary of MAs observed by a group of networks sensors, for example, all MAs 320 observed by sensors at a particular location, for a particular client, or even all network sensors connected to the network monitoring system. Thus, the GNS 370 may be used to provide a form of community profiling across all clients of the network monitoring system. In some embodiments, the generated GNSs 370 are used to build a GNS profile (not shown), and the GNSs may be evaluated against the GNS profile to detect anomaly conditions for the entire group of sensors. In some embodiments, an individual SNS 334 may be compared to the GNS 370 to determine if the SNS is anomalous. This type of comparison may be particularly useful where the SNS is associated with a network sensor that is new or does not have sufficient observation history.

As shown, both types of network state generators (the GNS generator 322 and the SNS generator 332) may use contextual data 340 to augment the data captured in the generated network states. In some embodiments, the generators will add automatic context to each generated network state, to include in the network state information such as the asset inventory information for the site or the environment where the sensor(s) reside (e.g. a cloud-hosted environment AWS, AZURE, etc.). In some embodiments, the added context information 340 may be configured manually by security analysts.

Finally, in some embodiments, the anomaly detection component may maintain a global network model 372 (GNM) that is built from sequences of historical GNSs 370. The global network model 372 captures the historical trend of metrics of many GNSs generated over time. Thus, the GNM models how the activities of client networks around the world changes with time, so that the anomaly detection system 340 can take into account seasonal variations of the GNS over time. For example, the global network model 372 may be used to detect a particular type of anomaly for a particular holiday, when observations of certain types of MAs are expected to be low. In some embodiments, the global network model may maintain counts for each type of MA seen globally, distributed over each hour for each day of the year. The times of MAs observed around the world may be normalized to a common time zone, so that the model can identify simultaneous activities in different parts of the world.

Figure 4:
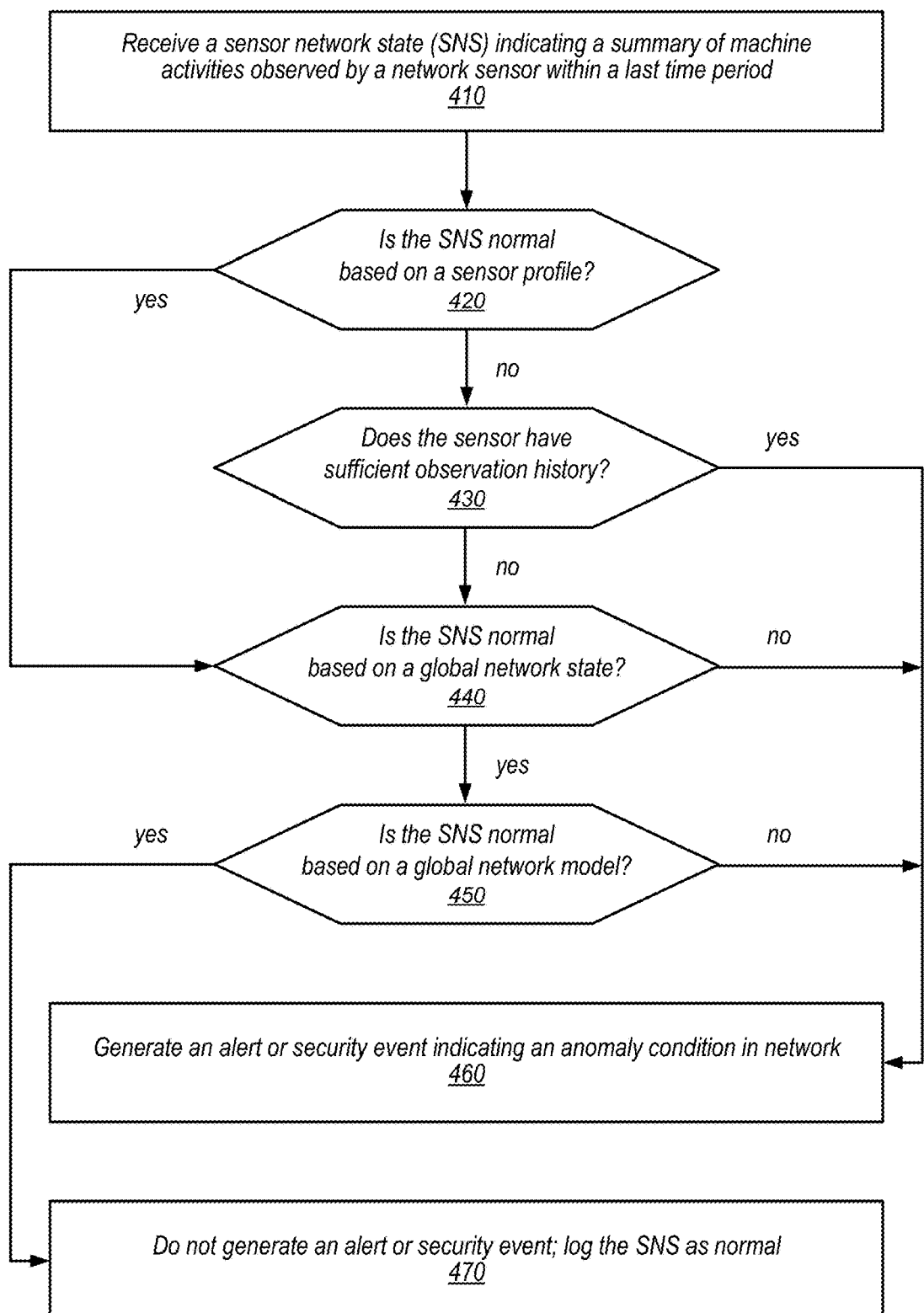
FIG. 4 is a flowchart illustrating a process to detect anomalies in a client network based on machine operations and machine activities recognized by a network data interpretation pipeline, according to some embodiments.

FIG. 4 is a flowchart illustrating a process to detect anomalies in a client network based on machine operations and machine activities recognized by a network data interpretation pipeline, according to some embodiments. This illustrated process may be performed by an embodiment of the anomaly detection system 340 of FIG. 3.

The process begins at operation 410, where a sensor network state (e.g. SNS 334) is received. The SNS may indicate a summary of machine activities observed by a network sensor (e.g. network sensor 120) within a last time period. In some embodiments, the SNS may be generated by a sensor network state generator 332, which will consume a stream of MAs generated by a component such as the MARE 180, and in turn generate a continuous stream of SNSs.

At operation 420, a determination is made whether the SNS is normal based on a sensor profile (e.g. sensor profile 360). For example, it may be common for a group of users to occasionally perform a "Delete Shared File" activity on a particular file repository, but a lot of users deleting a large number of files from the repository may be considered suspicious. This type of suspicious behavior may be captured by the SNS and may cause the system to generate an anomaly.

As shown, even if the SNS is considered abnormal, the process proceeds to operation 430, where the system checks whether the sensor has sufficient observation history. In some embodiments, this step may be used to filter out false positives detected based on data from "new" sensors whose sensor profiles have not been fully developed. However, if the abnormal SNS is detected based on data from a mature sensor (e.g. one that already has a fully developed sensor profile), the detection will be treated as an anomaly condition for the client network. As shown, at operation 460, an alert or security event that indicates the anomaly condition may be generated.

At operation 440, the SNS is further evaluated against a global network state (e.g. GNS 370) to determine if the SNS is normal in view of the GNS. In some embodiments, this comparison may be made only when a network sensor does not have sufficient observation history, as determined in operation 430. In other embodiments, this evaluation step may be made regardless of the maturity of the network sensor. As one example, a particular SNS may indicate no instances of a "Download OS Update" activity, which is not considered abnormal in view of the sensor profile alone. However, if the GNS for the same period indicates a large number of this activity in other sensors globally, the particular SNS may be considered suspicious. For example, this detected anomaly may suggest misconfigurations in the client network, such as machines with regular updates disabled.

Finally, at operation 450, a further check is made to determine whether the SNS is normal based on a global network model (e.g. global network model 372). As discussed, in some embodiments, the global network model may be built from historical GNSs to model time-based variations in various characteristics of the GNS. As an example, the global network model may be trained to understand that there is usually a drop in certain types of MAs on a public holiday such as Christmas. A SNS generated on Christmas that does not indicate the expected drop may appear normal according to the sensor profile, but will be detected as abnormal based on the global network model. In some embodiments, the opposite may be true. That is, a SNS may be detected as abnormal based on the sensor profile alone, but recognized as a false positive when evaluated using the global network model. In that case, the process will proceed to operation 470, where the SNS will be logged as normal and no alerts or security events will be generated. As will be appreciated by those skilled in the art, different embodiments of anomaly detection systems may implement the anomaly detection process differently. Thus, the logical flow depicted in the figure is merely illustrative and may vary from embodiment to embodiment.

Figure 5:
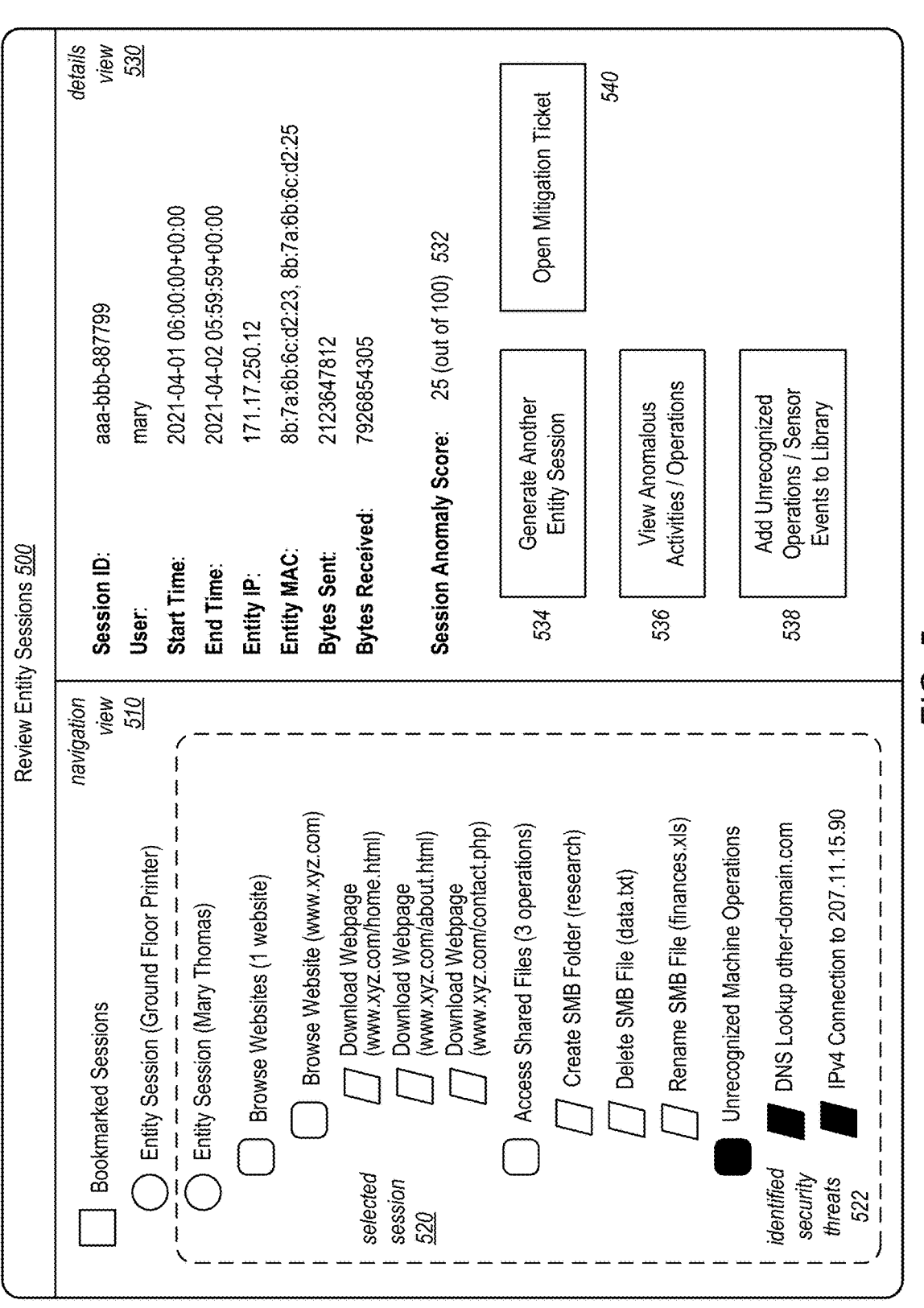
FIG. 5 illustrates a graphical user interface that allows a user to examine entity sessions constructed from machine operations and machine activities recognized for individual entities in a client network, according to some embodiments.

FIG. 5 illustrates a graphical user interface that allows a user to examine entity sessions constructed from machine operations and machine activities recognized for individual entities in a client network, according to some embodiments. The GUI 500 shown in the figure may be implemented by an embodiment of the network monitoring system 150 of FIG. 1. In some embodiments, the GUI 500 may be provided as a web-based interface that can be downloaded and displayed in a web browser.

As shown, the GUI 500 is divided into two sections or views. The navigation view 510 provides a tree control that can be used to navigate through different entity sessions. In this example, the tree lists a number of ESs that are bookmarked by the user for quicker access. The tree may allow users to expand and collapse an ES and portions within the ES, and also to select a particular ES or portions of the ES. As shown in this example, an ES generated for a user Mary Thomas is the selected 520, and the details of this ES are displayed in the details view 530 on the right.

As shown, in some embodiments, the ES may be displayed as a hierarchy that corresponds to the MA, MO, and NSE data objects in the ES. As shown, ES 520 includes a number of top-level MAs, such as a Browse Website MA and a Access Shared Files MA. These MAs may be displayed in chronological order. As shown, the tree also lists the respective MOs (and possibly NSEs) within each MA. For example, the Browse Website MA includes three Download Webpage MOs. As shown, the MAs and MOs shown in the tree control are each labeled with a descriptive name. These descriptive names may be human-friendly descriptions of the data objects and uniquely associated with each type of MA or MO, as discussed in connection with FIGS. 2B and 2C.

As shown, the navigation view 510 identifies a number of unrecognized MOs as potential security threats 522. As discussed, in some embodiments, those MOs or NSEs that could not be matched to a higher-level data object are considered to be potential anomalies in the network. In this example, the unrecognized MOs are prominently displayed so that the security analyst can quickly see and investigate these MOs. In some embodiments, the unrecognized MOs and NSEs may be identified by other alert mechanisms such as an alert report or email to the security analyst.

As shown, the details view 530 displays various information about the selected ES 520. This detailed information may include attributes that are stored as part of the ES data object, as discussed in connection with FIG. 2D. Additionally, the details view here also shows a session anomaly score 532, which may be computed based on one or more anomaly detection processes, such as the processes discussed in connection with FIG. 3. In some embodiments, this anomaly score 532 may be used to trigger alerts or security events in the network monitoring system.

As shown, the details view 530 additionally provides a number of buttons that allows a security analyst to perform various actions. Button 534 allows the user to generate (or bookmark) another ES, for example, a subsequent ES associated with the user Mary Thomas. Button 536 allows the user to view anomalous MOs or MAs within the selected ES

520. In some embodiments, each individual MA, MO, or NSE may be assigned an anomaly score, and those objects whose anomaly score exceeds a threshold may be flagged for further review. Button 538 allows the user to add unrecognized MOs or NSEs to a system's library. For example, the security analyst may determine that a particular unrecognized MO is actually part of an existing type of MA or a new type of undefined MA. If so, the analyst may update the recognition pattern in the library so that the MO will be properly recognized in the future. Finally, in this example, button 540 allows the user to open a mitigation ticket. This action may be performed if the analyst decided that the displayed information indicates a probable security threat. The mitigation ticket will notify other security analysts to take appropriate actions to address the security threat, for example, to reconfigure, quarantine, or shutdown one or more affected assets. It is noted that the buttons and actions described here are merely illustrative; other embodiments of the system may provide other types of GUI controls to enable different types of actions during review of entity sessions.

Figure 6:
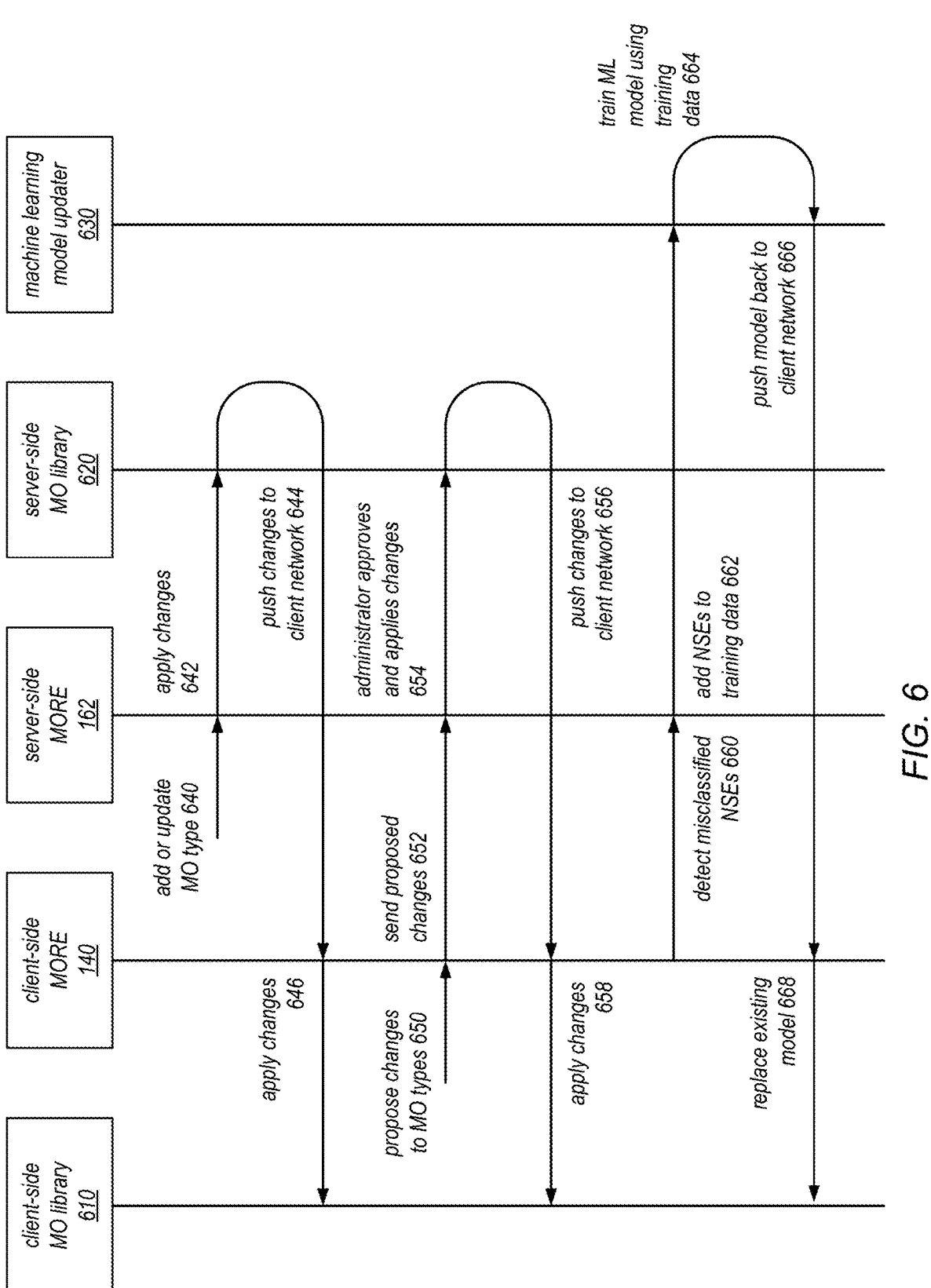
FIG. 6 is a system sequence diagram illustrating interactions among components of a network data interpretation pipeline to update a library of machine operations maintained by the pipeline, according to some embodiments.

FIG. 6 is a system sequence diagram illustrating interactions among components of a network data interpretation pipeline to update a library of machine operations maintained by the pipeline, according to some embodiments. The components shown in the figure may be implemented by an embodiment of the network data interpretation pipeline 100 of FIG. 1.

As shown, in some embodiments, the pipeline may implement two MO libraries. The client-side MO library 610 may be configured to store MO types and associated MO recognition patterns at the client network. This library 610 is used by the client-side MORE 140 to recognize MOs. The server-side MO library 620 is also configured to store MO types and MO recognition patterns, but at the network monitoring system. This library may be used by the server-side MORE 162 to recognize additional MOs, as discussed in connection with FIG. 1. In some embodiments, these two libraries may be kept roughly synchronized for at least some MO types. The server-side MO library 620 may serve as a master version of the MO type data, while the client-side MO library 610 will periodically receive updates to synchronize with the server-side library. In some embodiments, the server-side library 620 may store a larger set of MO types than the client-side library 610. For example, in some embodiments, certain types of higher-level MO types that are more difficult to recognize may only be stored in the server-side library. In some embodiments, some MO types may be stored only in the client-side library 610. For example, certain types of client-specific MO types may be stored only locally at the client network.

As shown, the diagram depicts three ways in which these libraries can be updated. In the first sequence at the top of the diagram, a user (e.g. an administrator of the pipeline) adds or updates 640 a MO type in the pipeline. In this example, operation 640 is performed at the server-side MORE 162, which may provide a configuration interface to perform such an operation. The update is applied 642 to the server-side MO library 620. In some embodiments, a change in the contents of the server-side MO library 620 will automatically cause the changes to be pushed 644 to the client network. For example, client-side MORE 140 may implement a programmatic interface (e.g. an API) to receive any changes from the server-side MO library. Once the changes are received by the client-side MORE 140, the changes will be applied 646 to the client-side MO library 610, which will be used by the client-side MORE to perform further MO recognitions.

In the second sequence shown in the middle of the diagram, a change to the MO types is proposed 650 at the client-side MORE 140. The proposal may be made by a user in the client network. For example, in some embodiments, the client-side MORE 140 may allow users to indicate a sequence of NSEs as a particular type of MO or propose a new type of MO. In some embodiments, when a sequence of NSEs cannot be matched to a known type of MO, the client-side MORE 140 may automatically ask the user to specify a MO type for the NSE sequence. The proposed changes to the MO types are then sent 652 by the client-side MORE to the server-side MORE, where an administrator may approve or deny the proposed changes. If approved, the changes will be applied 654 to the server-side MO library 620. The changes will then be pushed back 656 to the client network and applied 658 to the client-side MO library 610, as in the top sequence. Accordingly, some embodiments of the pipeline may allow the MO libraries to be augmented based on a crowdsourcing mechanism, where new library data is gathered from a large population of users in the client networks.

Finally, in the third sequence at the bottom of the diagram, a misclassified sequence of NSEs is detected 660 at the server-side MORE 160. For example, the NSEs may be incorrectly recognized as one type of MO, when they actually should be classified as another type of MO. The misclassification may be made by a machine learning model deployed at the client-side MORE 140. In some embodiments, the misclassification may be detected at the server-side MORE, based on a reexamination of the NSEs by the server-side MORE. Alternatively, the misclassification may be detected at the client network (e.g. by a user), and reported to the server-side MORE. When the misclassification is identified, the server-side MORE 162 may automatically add 662 the misclassified sequence of NSEs to a training dataset. The training dataset will collect various instances of misclassified NSE sequences in the field, and be used by a machine learning model updater 630 to train or update 664 a server-side copy of the machine learning model used to classify NSE sequences. The server-side ML model may be retrained periodically using the training data to improve its performance against misclassifications identified in the field. Once the model has been successfully retrained, it will be pushed back 666 to the client network, where it will replace 668 the existing classification model to improve classification performance of the client-side MORE. In some embodiments, this sequence may be repeated continuously to automatically improve the performance of the ML model (s) used by network data interpretation pipeline.

FIG. 7 is a flowchart illustrating a process of recognizing and uploading machine operations performed by a machine operation recognition engine implemented in a network data interpretation pipeline (e.g. the network data interpretation pipeline 100 of FIG. 1), according to some embodiments.

At operation 710, a sequence of NSEs (e.g. NSEs 210) is received. As discussed, these NSEs may be generated by one or more network sensors (e.g. network sensors 120) in a client network, based on network traffic observed in the client network. In some embodiments, these network sensors will indicate events such as network requests or responses in different network protocols (e.g. DNS, HTTP, NFS, etc.). In some embodiments, some NSEs may indicate metadata of an IP flow, including the source and destination of the IP flow, the protocol used, the beginning and ending times of the flow, and the amount of data sent and received by the source or destination node. In some embodiments, each NSE may be associated with a timestamp so that the NSEs can be sequenced chronologically.

At operation 720, a set of machine events (e.g. machine events 132) is received. As discussed, the machine events may be generated or captured by one or more data collection agents (e.g. agents 130) deployed in the client network to capture metadata about the execution of individual machines. In some embodiments, a machine event may indicate a particular process or a command that executed on a particular machine. For example, a machine event may indicate the execution of a user command (e.g. a "host" command) at a command line prompt. The machine event may also indicate the user associated with the command. As with the NSEs, each machine event may be associated with a timestamp that allows the machine events to be sequenced. In some embodiments, these machine events may be logged in a log file that can be accessed by the client-side MORE.

As shown, operations 732 and 734 are performed together 730 by a machine operation recognition engine such as the client-side MORE 140 of FIG. 1. At operation 732, a sequence of NSEs on a machine is recognized as a MO (e.g. MO 220). The MO will represent an operation on the machine that caused the sequence of NSEs, for example, an operation to download a webpage that causes a sequence of DNS and HTTP communications between a web browser and one or more web servers. The recognized MO will correspond to one of several MO types recognized by the MORE based on different MO recognition patterns. In some embodiments, the MO recognition patterns may be encoded as matching rules that can be applied to sequences of observed NSEs. If a NSE sequence satisfies a matching rule, the sequence will be recognized as the MO type associated with the matching rule. In some embodiments, at least some of the MO detection patterns may be implemented using a machine learning model, which has been trained using machine learning techniques to classify NSE sequences as MOs. In some embodiments, the MO recognition may be performed based on a matching of the NSE sequence to machine events observed on the machine. A successful match will allow the NSE sequence to be more confidently linked to an executed command on the machine, and the user who initiated the command.

At operation 734, the MORE determines NSEs that are not recognized as part of any of the MO types. For example, the MORE may identify an observed NSE sequence that does not satisfy any of the matching rules used by the MORE or cannot be confidently classified as any known MO type according to a MO classification model.

At operation 740, the recognized MOs and unrecognized NSEs are uploaded to a network monitoring system (e.g. network monitoring system 150). The network monitoring system will analyze the uploaded MOs and NSEs to detect anomaly conditions in the client network. In some embodiments, the network monitoring system may be implemented as a centralized service that is configured to monitor many client networks for signs of security incidents or threats, such as intrusions, data exfiltrations, deployment of malware, or other types of cyberattacks. In some embodiments, the MOs and NSEs are uploaded regularly over a public network such as the Internet. Advantageously, by condensing the NSEs into a set MO data objects, the amount of data that is uploaded is drastically reduced, resulting in a more efficient and secure data upload pipeline. In some embodiments, NSE sequences that cannot be recognized as a known type of MO may be treated as anomalies by the network monitoring system, so that these NSEs will be examined more closely by security analysts.

FIG. 8 is a flowchart illustrating a process of recognizing machine activities performed by a machine activity recognition engine and using the machine activities to detect security threats in a client network, according to some embodiments.

At operation 810, a set of MOs and NSEs for a machine are received from a client network. The MOs and NSEs may be the MOs and NSEs uploaded by operation 740 of FIG. 7. As discussed, each MO may represent an operation on the machine recognized by a client-side MORE based on NSEs (and possibly machine events) associated with the machine, and the unrecognized NSEs are those NSEs associated with the machine that were not recognized as part of any MO. In some embodiments, the MOs and NSEs may be received via a data receiving interface of the network monitoring system that is specifically tasked to receive this data from different client networks.

At operation 820, additional MOs are recognized from the unrecognized NSEs. In some embodiments, the recognition of additional MOs may be performed by a server-side MORE, such as the server-side MORE 160 of FIG. 1. The recognition may be accomplished based on a match of some of the unrecognized NSEs to logged machine events (e.g. indicating executed commands) of the machine, which may be uploaded to the network monitoring system from the client network. In some embodiments, the server-side MORE may have access to a larger library of MO types, more sophisticated MO recognition patterns, and richer contextual data such as server logs, asset inventory data, etc., so that it is able to recognize more types of MOs from the NSEs.

As shown, operations 832 and 834 are performed together 830 by a machine activity recognition engine such as the MARE 180 of FIG. 1. At operation 832, a sequence of MOs on the machine is recognized as a MA (e.g. MA 240), where the MA corresponds to one of several MA types recognized by the MARE based on different MA recognition patterns. For example, a MA may represent the browsing of a website that occurred on a machine, and the activity may be recognized based on several MOs downloading webpages from the website. In some embodiments, the MA recognition patterns may be encoded as matching rules that can be applied to sequences of MOs and NSEs. In some embodiments, at least some of the MA detection patterns may be implemented using a machine learning model, which has been trained using machine learning techniques to classify MO and NSE sequences as MAs. In some embodiments, the MA recognition may be performed using additional data such as machine event logs, asset inventory information, user information, etc. In some embodiments, a MA type may be defined to capture a type of malicious behavior, such as a specific type of data exfiltration. When this type of MA is recognized in the client network, a security event or alert may be generated by the network monitoring system.

At operation 834, the MARE determines MOs (and NSEs) that are not recognized as part of any of the MA types. For example, the MARE may identify an observed MO sequence that does not satisfy any of the matching rules used by the MARE or cannot be confidently classified as any known MA type according to a MA classification model.

At operation 840, the MAs recognized on the machine and any unrecognized MOs are used to detect an anomaly condition in the client network. The detection may be performed by an embodiment of the anomaly detection system 340 of FIG. 3. In some embodiments, an unrecognized MO or NSE may itself be seen as an anomaly. In some embodiments, individual MAs may be evaluated to determine whether the activity is anomalous on a machine. In some embodiments, groups of MAs may be aggregated into summary data structures such as sensor network states 334, global network states 370, and entity sessions 250, as discussed previously. These data structures may be compared to corresponding profiles and models in order to detect anomaly conditions in the network. In some embodiments, these data structures may be generated continuously, and the anomaly detection system will continuously examine the data structures to monitor the client network for anomalies.

Finally, at operation 850, the network monitoring system generates an alert or security event (e.g. alert or security event 380) indicating the detected anomaly condition. Depending on the embodiment, the alert or security event may be generated via a GUI, via a notification interface such as a text or email, or simply logged or stored in an alert or security event repository. These alerts or security events are generated automatically based on the data objects produced by the network data interpretation pipeline, and allow security analysts to quickly focus their attention on suspicious activity patterns in the network.

Figure 9:
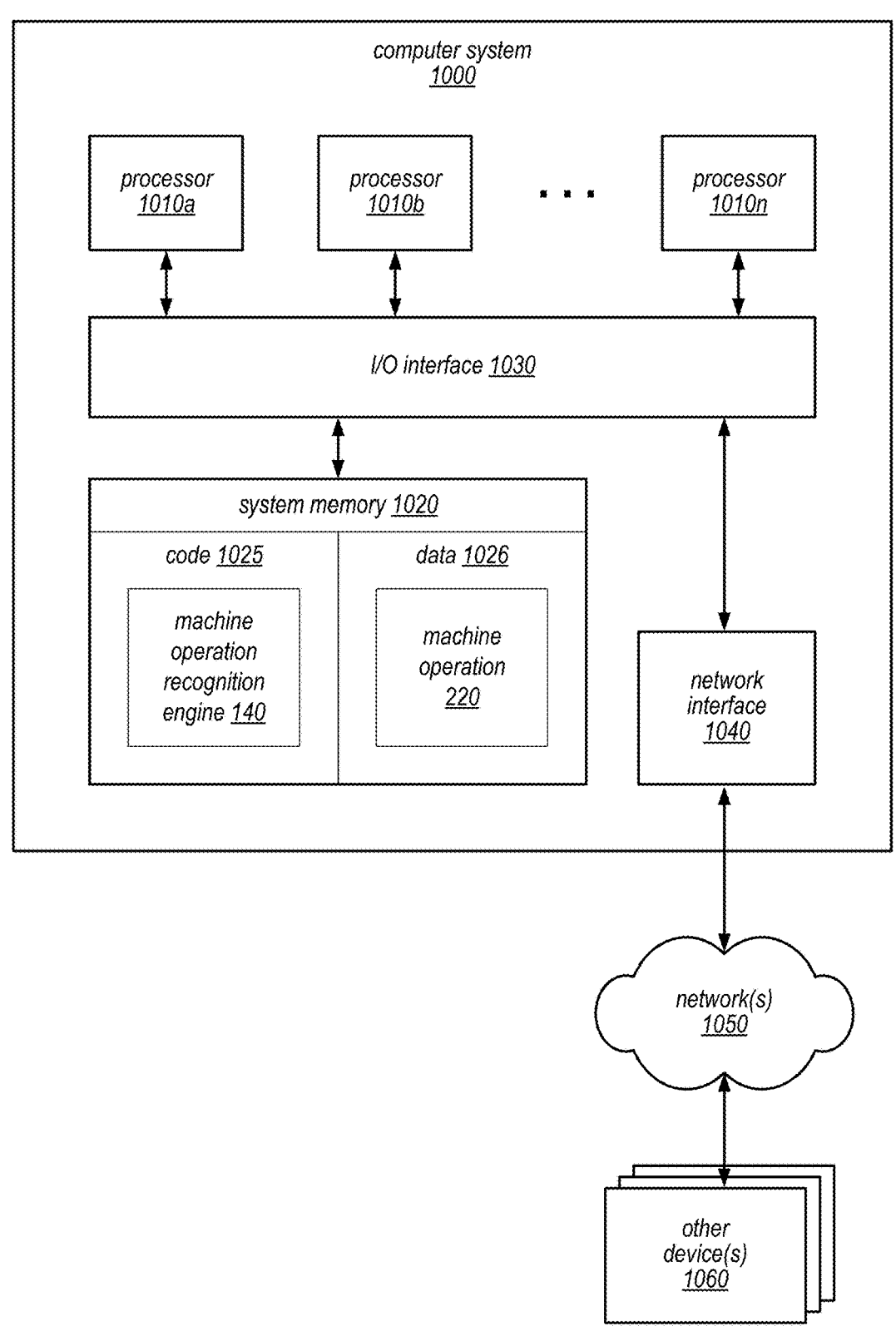
FIG. 9 is a block diagram illustrating an example computer system that can be used to implement one or more portions of a network data interpretation pipeline that recognizes machine operations and machine activities based on network sensor events observed in a client network, according to some embodiments.

FIG. 9 is a block diagram illustrating an example computer system that can be used to implement one or more portions of a network data interpretation pipeline that recognizes machine operations and machine activities based on network sensor events observed in a client network, according to some embodiments. For example, the computer system 1000 may be used to implement one or more components of the network data interpretation pipeline 100 of FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. As shown, computer system 1000 includes one or more processors 1010, which may be the multithreading processor 140 of FIG. 1. These processors 1010 may multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. In various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device.

The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may store instructions that implement the MORE 140, as discussed. The system memory 1020 may also be used to store data 1026 needed or produced by the executable instructions. For example, the in-memory data 1026 may be used to store a sequence of recognized MOs 220, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system

1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system comprising:

one or more computer devices that implement a machine operation recognition engine (MORE), configured to:
    receive a plurality of network sensor events (NSEs) in a computer network generated by one or more network sensors; and
    recognize, using a client-side machine learning (ML) model, a sequence of the NSEs as a machine operation (MO), wherein the MO represents an operation on a machine that caused the sequence of NSEs, and the MO corresponds to a MO type that is one of a plurality of MO types recognized by the client-side ML model based on different MO recognition patterns;

one or more computer devices that implement a network monitoring system, configured to:
    receive a set of recognized MOs and from the MORE, and subsequently:
        analyze the set of recognized MOs to detect security threats in the computer network;
        detect a set of misclassified NSEs in the set of recognized MOs; and
        add the set of misclassified NSEs to a training dataset for the server-side ML model;
    receive, from the MORE, a set of unrecognized NSEs that are not recognized as part of any of the MO types, and subsequently:
        obtain user input indicating that one or more of the unrecognized NSEs corresponds to an existing MO type; and
        add the one or more unrecognized NSEs corresponding to the existing MO type to the training dataset;
    train a server-side ML model using the training dataset; and
    push the server-side ML model to the MORE to replace the client-side ML model.

2. The system of claim 1, wherein the security threats detected by the network monitoring system includes security vulnerabilities of the computer network to different types of cyberattacks.

3. The system of claim 1, wherein the server-side ML model includes one or more of:
  a K-Nearest Neighbor model,
  a Hidden Markov Model, a Convolutional Neural Network, or
  a Recurrent Neural Network.

4. The system of claim 1, wherein the network monitoring system is configured to train the server-side ML model with a supervised machine learning technique using labeled NSE sequences.

5. The system of claim 1, wherein the network monitoring system is configured to retrain the server-side ML model periodically.

6. The system of claim 1, wherein:
  the MO is reported to the network monitoring system over a wide area network; and
  the network monitoring system is configured to monitor a plurality of computer networks for security threats based on MOs reported from the computer networks.

7. The system of claim 1, wherein the MO is recognized based on a match of the sequence of NSEs to one or more commands executed on the machine captured in a machine event log.

8. The system of claim 1, wherein the MORE is configured to populate attributes of the MO, including a descriptive name of the MO, a source address of the MO, a destination address of the MO, a start time of the MO, an end time of the MO, an amount of data sent by the source address, and an amount of data received by the source address.

9. The system of claim 8, wherein the MORE is configured to populate additional attributes of the MO, including one or more of: a description of the NSEs recognized as the MO, a description of network flows associated with the MO, a username associated with the MO, and one or more geographic locations associated with the MO.

10. The system of claim 1, wherein to analyze the set of recognized MOs to detect security threats in the computer network, the network monitoring system, configured to detect one or more anomaly conditions based on historical MOs previously observed in the computer network.

11. A method comprising:

performing, by a network operation recognition engine (MORE) implemented using by one or more computer devices:
    receiving a plurality of network sensor events (NSEs) in a computer network generated by one or more network sensors; and
    recognizing, using a client-side machine learning (ML) model, a sequence of the NSEs as a machine operation (MO), wherein the MO represents an operation on a machine that caused the sequence of NSEs, and the MO corresponds to a MO type that is one of a plurality of MO types recognized by the client-side ML model based on different MO recognition patterns;

performing, by a network monitoring system implemented by one or more computer devices:
    receiving a set of recognized MOs and from the MORE, and subsequently:
        analyzing the set of recognized MOs to detect security threats in the computer network;
        detecting a set of misclassified NSEs in the set of recognized MOs; and
        adding the set of misclassified NSEs to a training dataset for the server-side ML model;
    receiving, from the MORE, a set of unrecognized NSEs that are not recognized as part of any of the MO types, and subsequently:
        obtaining user input indicating that one or more of the unrecognized NSEs corresponds to an existing MO type; and adding the one or more unrecognized NSEs corresponding to the existing MO type to the training dataset;

training a server-side ML model using the training dataset; and pushing the server-side ML model to the MORE to replace the client-side ML model.

12. The method of claim 11, wherein the security threats detected by the network monitoring system includes security vulnerabilities of the computer network to different types of cyberattacks.

13. The method of claim 11, wherein the server-side ML model includes one or more of:

a K-Nearest Neighbor model, a Hidden Markov Model, a Convolutional Neural Network, or a Recurrent Neural Network.

14. The method of claim 11, further comprising the network monitoring system:

training the server-side ML model with a supervised machine learning technique using labeled NSE sequences.

15. The method of claim 11, further comprising the network monitoring system:

retraining the server-side ML model periodically.

16. The method of claim 11, wherein:

the MO is reported to the network monitoring system over a wide area network; and the network monitoring system is configured to monitor a plurality of computer networks for security threats based on MOs reported from the computer networks.

17. The method of claim 11, wherein the MO is recognized based on a match of the sequence of NSEs to one or more commands executed on the machine captured in a machine event log.

18. The method of claim 11, wherein the MORE is configured to populate attributes of the MO, including a descriptive name of the MO, a source address of the MO, a destination address of the MO, a start time of the MO, an end time of the MO, an amount of data sent by the source address, and an amount of data received by the source address.

19. The method of claim 18, wherein the MORE is configured to populate additional attributes of the MO, including one or more of: a description of the NSEs recognized as the MO, a description of network flows associated with the MO, a username associated with the MO, and one or more geographic locations associated with the MO.

20. The method of claim 11, wherein analyzing the set of recognized MOs to detect security threats in the computer network comprises detecting one or more anomaly conditions based on historical MOs previously observed in the computer network.

* * * * *